(12) United States Patent
Mancilla et al.

(10) Patent No.: US 9,897,260 B1
(45) Date of Patent: Feb. 20, 2018

(54) CONTROL SYSTEM IN AN INDUSTRIAL GAS PIPELINE NETWORK TO SATISFY ENERGY CONSUMPTION CONSTRAINTS AT PRODUCTION PLANTS

(71) Applicant: Air Products and Chemicals, Inc., Allentown, PA (US)

(72) Inventors: Camilo Mancilla, Allentown, PA (US); Ali Esmaili, Emmaus, PA (US); Joshua David Isom, Allentown, PA (US); Catherine Catino Latshaw, Fogelsville, PA (US); Oliver Jacob Smith, IV, New Tripoli, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/490,308

(22) Filed: Apr. 18, 2017

(51) Int. Cl.
*G05D 11/00* (2006.01)
*G05D 7/00* (2006.01)
*F17D 3/01* (2006.01)
*F17D 1/04* (2006.01)
*F17D 5/00* (2006.01)
*G05D 7/06* (2006.01)

(52) U.S. Cl.
CPC ............ *F17D 3/01* (2013.01); *F17D 1/04* (2013.01); *F17D 5/005* (2013.01); *G05D 7/0629* (2013.01)

(58) Field of Classification Search
CPC .. F17D 3/01; F17D 1/04; F17D 5/005; G05D 7/0629
USPC ....................................................... 700/282
See application file for complete search history.

(56) References Cited

U.S. PATENT DOCUMENTS

| | | |
|---|---|---|
| 4,200,911 A | 4/1980 | Matsumoto |
| 4,835,687 A | 5/1989 | Martin |
| 6,236,894 B1 | 5/2001 | Stoisits et al. |
| 6,697,713 B2 | 2/2004 | Megan et al. |
| 6,701,223 B1 | 3/2004 | Rachford, Jr. et al. |
| 6,993,403 B1 | 1/2006 | Dadebo et al. |
| 7,561,928 B2 | 7/2009 | Peureux et al. |

(Continued)

OTHER PUBLICATIONS

Mixed Integer Models for the Stationary Case of Gas Network Optimization Received: Apr. 2004 / Accepted: May 10, 2005 Published online: Nov. 10, 2005.*

(Continued)

*Primary Examiner* — Ziaul Karim
(74) *Attorney, Agent, or Firm* — Larry S. Zelson

(57) ABSTRACT

Controlling flow of gas in an gas pipeline network, wherein flow of gas within each of the pipeline segments is associated with a direction (positive or negative). Processors calculate minimum and maximum production rates (bounds) at the gas production plant to satisfy an energy consumption constraint over a period of time. The production rate bounds are used to calculate minimum and maximum signed flow rates (bounds) for each pipeline segment. A nonlinear pressure drop relationship is linearized to create a linear pressure drop model for each pipeline segment. A network flow solution is calculated, using the linear pressure drop model, comprising flow rates for each pipeline segment to satisfy demand constraints and pressures for each of a plurality of network nodes over the period of time to satisfy pressure constraints. The network flow solution is associated with control element setpoints used to control one or more control elements.

13 Claims, 10 Drawing Sheets

(56) References Cited

U.S. PATENT DOCUMENTS

| | | | |
|---|---|---|---|
| 7,720,575 | B2 | 5/2010 | Ferber et al. |
| 8,762,291 | B2 | 6/2014 | Neagu et al. |
| 9,599,499 | B1 | 3/2017 | Chaudhary et al. |
| 2003/0144766 | A1* | 7/2003 | Megan .................. G05D 16/20 700/301 |
| 2003/0192693 | A1* | 10/2003 | Wellington ......... E21B 41/0064 166/267 |
| 2005/0137810 | A1 | 6/2005 | Esposito, Jr. et al. |
| 2005/0273204 | A1 | 12/2005 | Hansen et al. |
| 2007/0204930 | A1 | 9/2007 | Phallen et al. |
| 2007/0260333 | A1* | 11/2007 | Peureux .................... F17D 1/04 700/28 |
| 2009/0265292 | A1* | 10/2009 | Harper .................. G06N 3/126 706/13 |
| 2010/0152900 | A1 | 6/2010 | Gurciullo et al. |
| 2010/0174517 | A1 | 7/2010 | Slupphaug et al. |
| 2010/0222911 | A1* | 9/2010 | Castelijns ............. E21B 43/006 700/104 |
| 2013/0211601 | A1 | 8/2013 | Cheng et al. |
| 2014/0005841 | A1 | 1/2014 | Cheng et al. |
| 2015/0136248 | A1 | 5/2015 | Nagase et al. |
| 2016/0072891 | A1 | 3/2016 | Joshi et al. |
| 2016/0209851 | A1 | 7/2016 | Aughton et al. |

OTHER PUBLICATIONS

C.M. Correa-Posada, et al, "Gas Network Optimization: A comparison of Piecewise Llinear Models", Chemical Engineering Science, 2014, 1-24.

A. Gopalakrishnan, et al, "Economic Nonlinear Model Predictive Control for periodic optimal operation of gas pipeline networks", Computers and Chemical Engineering, 2013, 52, 90-99.

F. Tabkhi, et al, "Improving the Performance of Natural Gas Pipeline Networks Fuel Consumption Minimization Problems", American Institute of Chemical Engineers, 2010, 56, 946-964.

R.Z. Rios-Mercado, et al, "Optimization problems in natural gas transportation systems: A state-of-the-art review", Applied Energy, 2015, 147, 536-555.

K.G. Murty, et al, "Some NP-Complete Problems in Quadratic and Nonlinear Programming", Mathematical Programming, 1987, 39, 117-129.

R.K. Ahuja, et al, "Network Flows, Chapter 4 Shortest Paths: Label-Setting Algorithms", 1993, 93-132.

Ajinkya A. More, et al, "Analytical solutions for the Colebrook and White equation and for pressure drop in ideal gas flow in pipes", Chemical Engineering Science, 2006, 61, 5515-5519.

Dejan Brkic, "Lambert W Function in Hydraulics Problems", Mathematica Balkanica, 2012, 26, 285-292.

Alexander Martin, et al, "Mixed Integer Models for the Stationary Case of Gas Network Optimization", Math. Program., 2006, 563-582.

A. Martin, et al, "A Mixed Integer Approach for the Transient Case of Gas Network Optimization", 2007.

U.S. Appl. No. 15/490,268 filed Apr. 18, 2017, first named inventor Camilo Mancilla, titled Control System in a Gas Pipeline Network to Satisfy Pressure Constraints.

U.S. Appl. No. 15/490,268, Office Action dated Jul. 7, 2017.

U.S. Appl. No. 15/490,344 filed Apr. 18, 2017, first named inventor Catherine Catino Latshaw, titled Control System in an Industrial Gas Pipeline Network to Satisfy Energy Consumption Constraints at Production Plants.

U.S. Appl. No. 15/490,344, Office Action dated Jun. 27, 2017.

U.S. Appl. No. 15/490,394 filed Apr. 18, 2017, first named inventor Ali Esmaili, titled Control System in a Gas Pipeline Network to Increase Capacity Factor.

U.S. Appl. No. 15/490,394, Office Action dated Jul. 12, 2017.

* cited by examiner

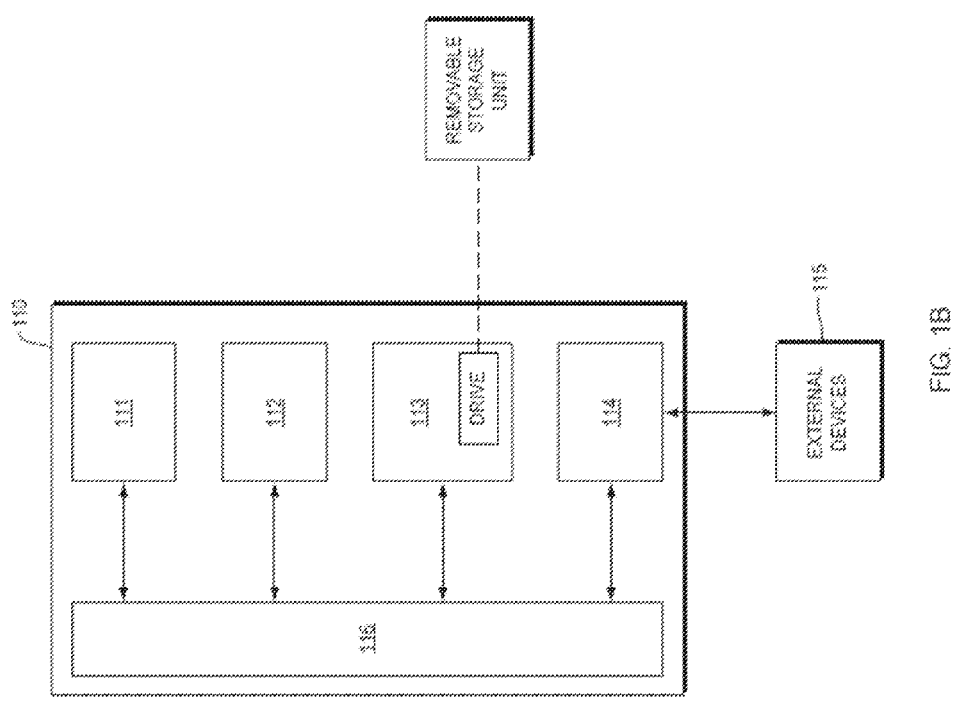

CONTROL SYSTEM IN AN INDUSTRIAL GAS PIPELINE NETWORK TO SATISFY ENERGY CONSUMPTION CONSTRAINTS AT PRODUCTION PLANTS

FIELD OF THE INVENTION

The invention relates to control of industrial gas pipeline networks for the production, transmission and distribution of a gas.

BRIEF SUMMARY OF THE INVENTION

The present invention involves a system and method for controlling flow of gas in an industrial gas pipeline network to satisfy energy consumption constraints at an industrial gas production plant. A gas pipeline network includes at least one gas production plant, at least one gas receipt facility of a customer, a plurality of pipeline segments, a plurality of network nodes, and a plurality of control elements. The flow of gas within each of the plurality of pipeline segments is associated with a direction. The direction is associated with a positive sign or a negative sign. The system includes one or more controllers and one or more processors. The processors are configured to calculate a minimum production rate and a maximum production rate at the gas production plant to satisfy a constraint on consumption of energy over a period of time. The minimum production rate and the maximum production rate comprise bounds on the production rate for the plant. The bounds on the production rate for the plant are used to calculate a minimum signed flow rate and a maximum signed flow rate for each of the pipeline segments. The minimum signed flow rate and the maximum signed flow rate constitute flow bounds for each pipeline segment. A nonlinear pressure drop relationship for each of the plurality of pipeline segments within the flow bounds is linearized to create a linear pressure drop model for each of the plurality of pipeline segments. A network flow solution is calculated, using the linear pressure drop model. The network flow solution comprises flow rates for each of the plurality of pipeline segments to satisfy demand constraints and pressures for each of the plurality of network nodes over the period of time to satisfy pressure constraints. The network flow solution is associated with control element setpoints. At least one of the controllers within the system receives data describing the control element setpoints and control at least some of the plurality of control elements using the data describing the control element setpoints.

In some embodiments, a linear model relating energy consumption to industrial gas production is used to calculate the minimum production rate and the maximum production rate at the industrial gas production plant to satisfy a constraint on consumption of energy over the period of time. In certain embodiments, the linear model is developed using a transfer function model In some embodiments, ramping constraints on the industrial gas production plant over the period of time are considered in connection with calculating the network flow solution.

In some embodiments, the minimum signed flow rate and the maximum signed flow rate are calculated by: bisecting an undirected graph representing the gas pipeline network using at least one of the plurality of pipeline segments to create a left subgraph and right subgraph; calculating a minimum undersupply in the left subgraph by subtracting a sum of demand rates for each of the gas receipt facilities in the left subgraph from a sum of minimum production rates for each of the gas production plants in the left subgraph; calculating a minimum unmet demand in the right subgraph by subtracting a sum of maximum production rates for each of the gas production plants in the right subgraph from a sum of demand rates for each of the gas receipt facilities in the right subgraph; calculating the minimum signed flow rate for at least one of the pipeline segments as a maximum of a minimum undersupply in the left subgraph and a minimum unmet demand in the right subgraph; calculating a maximum oversupply in the left subgraph by subtracting the sum of the demand rates for each of the gas receipt facilities in the left subgraph from the sum of the maximum production rates for each of the gas production plants in the left subgraph; calculating a maximum unmet demand in the right subgraph by subtracting a sum of the minimum production rates for each of the gas production plants in the right subgraph from the sum of the demand rates for each of the gas receipt facilities in the right subgraph; and calculating the maximum signed flow rate for at least one of the pipeline segments as a minimum of a maximum oversupply in the left subgraph and a maximum unmet demand in the right subgraph.

In some embodiments, an error in pressure prediction for each of the plurality of network nodes is bounded. The bounds are used to ensure that the network flow solution produced using the linearized pressure drop model satisfies pressure constraints when a nonlinear pressure drop model is used.

In some embodiments, the linear pressure drop model for one of the pipeline segments is a least-squares fit of the nonlinear pressure drop relationship within a minimum and a maximum flow range for the pipeline segment. In certain of these embodiments, a slope-intercept model is used if an allowable flow range does not include a zero flow condition and a slope-only model is used if the allowable flow range does include a zero flow condition.

In some embodiments, a linear program is used to create the network flow solution.

In some embodiments, the control element comprises a steam methane reformer plant. The flow control element may comprise an air separation unit, a compressor system, and/or a valve. Energy consumed at the industrial gas production plant may be in the form of a feedgas, such as natural gas or refinery gas consumed in the production of hydrogen gas; or in the form of electricity in the production of one or more atmospheric gases.

BACKGROUND

Gas pipeline networks have tremendous economic importance. As of September 2016, there were more than 2,700,000 km of natural gas pipelines and more than 4,500 km of hydrogen pipelines worldwide. In the United States in 2015, natural gas delivered by pipeline networks accounted for 29% of total primary energy consumption in the country. Due to the great importance of gas pipelines worldwide, there have been attempts to develop methods for calculating network flow solutions for gas pipeline networks. Some approaches involve stipulating in advance the direction of the flow in each pipeline segment. Such approaches have the advantage of reducing the complexity of the optimization problem. However, not allowing for flow reversals severely restricts the practical application. Still other approaches formulate the solution as a mixed-integer linear program. However, constructing efficient mixed-integer linear program formulations is a significant task as certain attributes can significantly reduce the solver effectiveness.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1B illustrates an exemplary processing unit in accordance with an exemplary embodiment of the present invention.

DETAILED DESCRIPTION OF THE EXEMPLARY EMBODIMENTS

The invention relates to the control of gas pipeline networks for the production, transmission, and distribution of a gas in a network which contains production plants that convert a feed gas into an industrial gas. An example of a relevant pipeline network is one in which steam methane reformer plants convert natural gas into hydrogen. Other types of hydrogen production plants may produce hydrogen from an impure syngas feed. As of September 2016, there were more than 4,500 km of hydrogen pipeline worldwide, all associated with plants producing hydrogen from a feedgas.

Another example of a relevant pipeline network is one in air separations units produce atmospheric gases which are then distributed to customers via the pipeline.

There are often constraints on the consumption of energy at industrial gas production plants.

Energy consumption constraints may take the form of an upper or a lower limit on the quantity of the feedgas that is consumed over a time period. For example, some hydrogen production plants are associated with a daily nominated consumption of natural gas. If more than the nominated quantity of natural gas is consumed over a twenty-four-hour period, then additional natural gas must be purchased on the spot market at a price which is volatile and which may be higher than the nomination price for the natural gas.

Energy consumption constraints may take the form of an upper or a lower limit on the consumption of electricity over a time period. For example, air separations units operating in deregulated electricity markets may make hourly nominations for the consumption of electricity at the plant. If more than the nominated quantity of electricity is consumed over a one-hour period, then additional electricity must be purchased on the spot market at a price which is volatile and which may be higher than the nomination price for the electricity.

In gas pipeline networks, flow through the network is driven by pressure gradients wherein gas flows from higher pressure regions to lower pressure regions. As a gas travels through a pipeline network, the pressure decreases due to frictional losses. The greater the flow of gas through a particular pipeline segment, the greater the pressure drop through that segment.

Gas pipeline networks have certain constraints on the pressure of the gas within the network. These include lower bounds on the pressure of a gas delivered to a customer, and upper bounds on the pressure of a gas flowing through a pipeline. It is desirable for the operator of a gas pipeline network to meet pressure constraints. If upper limit on pressure are not satisfied, vent valves may open to release gas from the network to the atmosphere. If lower bounds on the pressure of gas supplied to a customer are not met, there may be contractual penalties for the operator of the gas pipeline network.

Figure 1A:
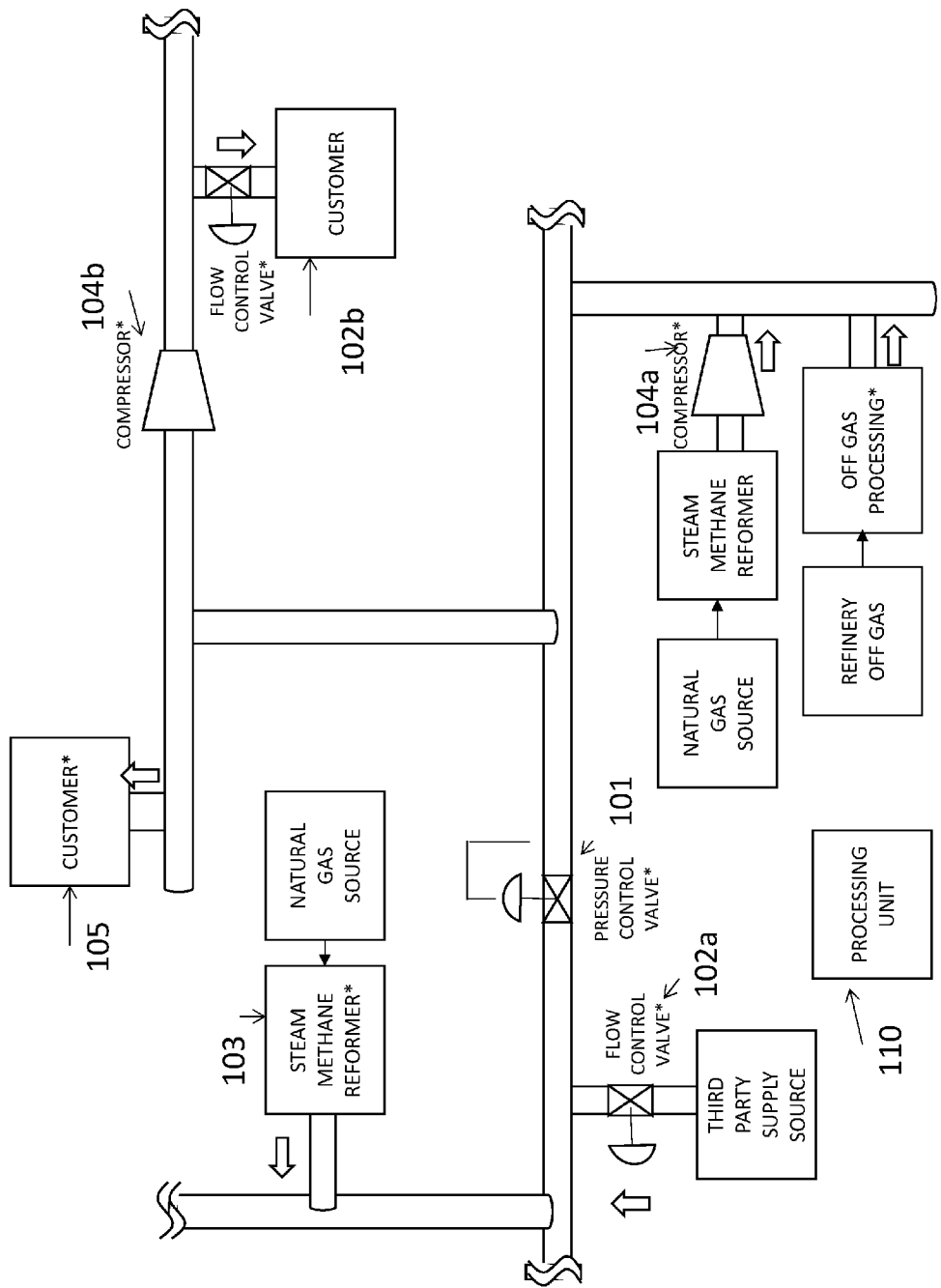
FIG. 1A illustrates an exemplary gas pipeline network.

To meet constraints on flows delivered to customers, pressures within the network, and energy consumption constraints, gas pipeline networks include control elements which are operable to regulate pressure and flow. FIG. 1A illustrates an exemplary hydrogen gas pipeline network. This exemplary network illustrates at least certain of the physical elements that are controlled in accordance with embodiments of the present invention. Flow control elements are operable to receive setpoints for the flow or pressure of gas at a certain location in the network, and use feedback control to approximately meet the setpoint. Thus, control elements include pressure control elements and flow control elements 102a, 102b.

Industrial gas production plants associated with a gas pipeline network are control elements, because they are operable to regulate the pressure and flow of gas supplied into the network. Examples of industrial gas production plants include steam methane reformer plants 103 for the production of hydrogen, carbon monoxide, and/or syngas; and air separation units for the production of oxygen, nitrogen, and/or argon. These plants typically are equipped with a distributed control system and/or model predictive controller which is operable to regulate the flow of feedgas into the production plant and the flow and/or pressure of product gas supplied to the gas pipeline network.

Natural gas receipt points are control elements, because they include a system of valves and/or compressors to regulate the flow of natural gas into the natural gas pipeline network.

Natural gas delivery points are control elements, because they include a system of valves and/or compressors to regulate the flow of natural gas out of the natural gas pipeline network.

Natural gas compressor stations 104a, 104b are control elements, because they are operable to increase the pressure and regulate the flow of natural gas within a natural gas pipeline network.

Industrial gas customer receipt points 105 are control elements, because they are operable to receive a setpoint to regulate the flow and/or pressure of an industrial gas delivered to a customer.

In order to operate a gas pipeline network, it is desirable to provide setpoints to flow control elements in such a fashion that customer demand constraints and pressure constraints are satisfied simultaneously. To ensure that setpoints for flow control elements will result in satisfying demand and pressure constraints, it is necessary to calculate simultaneously the flows for each gas pipeline segment and gas pressures at network nodes. As described herein, in an exemplary embodiment, network flow solution includes numerical values of flows for each pipeline segment and pressures for each pipeline junction that are: 1) self-consistent (in that laws of mass and momentum are satisfied), 2) satisfy customer demand constraints, 3) satisfy pressure constraints, and 4) satisfy energy consumption constraints.

The network flow solution may be determined using processing unit 110, an example of which is illustrated in FIG. 1B. Processing unit 110 may be a server, or a series of servers, or form part of a server. Processing unit 110 comprises hardware, as described more fully herein, that is used in connection with executing software/computer programming code (i.e., computer readable instructions) to carry out the steps of the methods described herein. Processing unit 110 includes one or more processors 111. Processor 111 may be any type of processor, including but not limited to a special purpose or a general-purpose digital signal processor. Processor 111 may be connected to a communication infrastructure 116 (for example, a bus or network). Processing unit 110 also includes one or more memories 112, 113. Memory 112 may be random access memory (RAM). Memory 113 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data. In alternative implementations, memory 113 may include other similar means for allowing computer programs or other instructions to be loaded into processing unit 110. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to processing unit 110. Alternatively, the program may be executed and/or the data accessed from the removable storage unit, using the processor 111 of the processing unit 110. Computer system 111 may also include a communication interface 114. Communication interface 114 allows software and data to be transferred between processing unit 110 and external device(s) 115. Examples of communication interface 114 may include a modem, a network interface (such as an Ethernet card), and a communication port, by way of example. Software and data transferred via communication interface 114 are in the form of signals, which may be electronic, electromagnetic, optical, or other signals capable of being received by communication interface 114. These signals are provided to communication interface 114 via a communication path. Communication path carries signals and may be implemented using wire or cable, fiber optics, a phone line, a wireless link, a cellular phone link, a radio frequency link, or any other suitable communication channel, including a combination of the foregoing exemplary channels. The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to processing unit 110. However, these terms may also include signals (such as electrical, optical or electromagnetic signals) that embody the computer program disclosed herein. Computer programs are stored in memory 112 and/or memory 113. Computer programs may also be received via communication interface 114. Such computer programs, when executed, enable processing unit 110 to implement the present invention as discussed herein and may comprise, for example, model predictive controller software. Accordingly, such computer programs represent controllers of processing unit 110. Where the invention is implemented using software, the software may be stored in a computer program product and loaded into processing unit 110 using removable storage drive, hard disk drive, or communication interface 114, to provide some examples.

External device(s) 115 may comprise one or more controllers operable to control the network control elements described with reference to FIG. 1A.

It is difficult to calculate a network flow solution for a gas pipeline network because of a nonlinear equation that relates the decrease in pressure of a gas flowing through a pipeline segment (the "pressure drop") to the flow rate of the gas.

This nonlinear relationship between flow and pressure drop requires that a nonconvex nonlinear optimization program be solved to calculate a network flow solution. Nonconvex nonlinear programs are known to be NP-complete (see Murty, K. G., & Kabadi, S. N. (1987). Some NP-complete problems in quadratic and nonlinear programming. Mathematical programming, 39(2), 117-129.). The time required to solve an NP-complete problem increases very quickly as the size of the problem grows. Currently, it is not known whether it is even possible to solve a large NP-complete quickly.

It is difficult and time-consuming to solve a large NP-complete program. Also, the nature of the solution of a nonconvex mathematical program typically depends greatly on the way the mathematical program is initialized. As a result of these difficulties in solving a nonconvex mathematical program, it has not been practical to control flows in in a gas pipeline to satisfy pressure constraints using network flow solutions produced by nonconvex mathematical programs.

Because of the difficulty of computing network flow solutions, it is not uncommon to have so-called stranded molecules in a gas pipeline network. Stranded molecules are said to exist when there is unmet demand for a gas simultaneous with unused gas production capacity, due to pressure limitations in the network.

Because of the difficulty of computing network flow solutions, flows of gas pipeline segments, and gas pressures in a gas pipeline network, it is not uncommon to vent an industrial gas to the atmosphere when there are flow disturbances in the network.

There exists a need in the art for a reliable and computationally efficient method of computing a network flow solution which can be used to identify setpoints for control elements in a gas pipeline network and, more particularly, a sufficiently accurate linearization of the relationship between flow and pressure drop in pipeline segments that could be used to quickly calculate network flow solutions satisfying energy consumption constraints which could, in turn, be used to identify setpoints for network flow control elements.

The present invention involves a method and system for controlling flows and pressures within an industrial gas pipeline network to satisfy a constraint on the consumption of energy for a production plant in the pipeline network. The minimum and maximum production rate at an industrial gas production plant which satisfies a constraint on the consumption of energy over a period of time is calculated, resulting in bounds on the production rate for the plant. The flow rate in each pipe segment in the network is bounded based on customer demand and the bunds on the production rate for each plant within the network. The relationship between pressure drop and flow rate for each pipe segment is linearized within the bounded flow rate range. Bounds on the error of the linearization of the pressure drop relationship are established. A linear model relates the consumption of energy to the production of an industrial gas. The linearized pressure drop relationships with bounded errors are used in conjunction with mass balance constraints, pressure constraints, supply constraints, and demand constraints to calculate a network flow solution which satisfies energy consumption constraints. Results of the network flow solution are received as setpoints by control elements.

The notation used in the detailed description of the preferred embodiments of the invention is provided below. The first column in the tables below shows the mathematical notation, the second column is a description of the mathematical notation, and the third column indicates the units of measure that may be associated with the quantity.

| | Sets | |
|---|---|---|
| $n \in N$ | Nodes (representing pipeline junctions) | |
| $j \in A$ | Arcs (representing pipe segments and control elements) | |
| $G = (N,A)$ | Graph representing the layout of the gas pipeline network | |
| $e \in \{in, out\}$ | Arc endpoints | |
| $(n,j) \in A_{in}$ | Inlet of arc]intersects node n | |
| $(n, j) \in A_{out}$ | Outlet of arc]intersects node n | |
| $n \in D \subset N$ | Demand nodes | |
| $n \in S \subset N$ | Supply nodes | |
| $j \in P \subset A$ | Pipe arcs | |
| $j \in C \subset A$ | Control element arcs | |
| $L_j \in N$ | Left subgraph for arc j | |
| $R_j \in N$ | Right subgraph for arc j | |
| | Parameters | |
| $D_j$ | Diameter of pipe j | [m] |
| R | Gas constant | [N m kmol$^{-1}$ K$^{-2}$] |
| Z | Compressibility factor | [no units] |
| $L_j$ | Length of pipe j | [m] |
| $M_W$ | Molecular weight of the gas | [kg kmol$^{-1}$] |
| $T_{ref}$ | Reference temperature | [K] |
| $\epsilon$ | Pipe roughness | [m] |
| $\alpha$ | Nonlinear pressure drop coefficient | [Pa kg$^{-1}$ m$^{-1}$] |
| $f_j$ | Friction factor for pipe j | [no units] |
| $\mu$ | Gas viscosity | [Pa s] |
| $Re_j$ | Reynolds number for flow in pipe j | [no units] |
| $q_j^{min}$ | Minimum flow rate for flow in pipe j | [kg/s] |
| $q_j^{max}$ | Maximum flow rate for flow in pipe j | [kg/s] |
| $b_j$ | Intercept for linear pressure drop model for pipe j | [Pa$^2$] |
| $m_j$ | Slope for linear pressure drop model for pipe j | [Pa$^2$s/kg] |
| $d_{n,t}$ | Demand in node n at time t | [kg/s] |
| $s_n^{min}$ | Minimum production in node n | [kg/s] |
| $s_n^{min}$ | Maximum production in node n | [kg/s] |
| | Variables | |
| $q_{j,t}$ | Flow rate in pipe j at time t | [kg/s] |
| $s_{n,t}$ | Production rate in node n at time t | [kg/s] |
| $y_{n,t}$ | Energy consumption in supply node n at time t | [kg/s] |
| $p_{n,t}^{node}$ | Pressure at node n at time t | [Pa] |
| $p_{j,t}^e$ | Pressure at a particular end of a particular pipe | [Pa] |
| $ps_{n,t}^{node}$ | node Squared pressure at node n at time t | [Pa$^2$] |
| $ps_{j,t}^e$ | Squared pressure at a particular end of a particular pipe at time t | [Pa$^2$] |
| $ps_j^{err}$ | Maximum absolute squared pressure drop error for pipe j | [Pa$^2$] |
| $ps_n^{err}$ | Maximum absolute squared pressure error for node n | [Pa$^2$] |

For the purposes of computing a network flow solution, the layout of the pipeline network is represented by an undirected graph with a set of nodes (representing pipeline junctions) and arcs (representing pipeline segments and certain types of control elements). Here, some basic terminology associated with undirected graphs is introduced.

An undirected graph G=(N,A) is a set of nodes N and arcs A. The arc set A consists of unordered pairs of nodes. That is, an arc is a set {m,n}, where m,n∈N and m≠n. By convention, we use the notation (m,n), rather than the notation {m,n}, and (m,n) and (n,m) are considered to be the same arc. If (m,n) is an arc in an undirected graph, it can be said that (m,n) is incident on nodes m and n. The degree of a node in an undirected graph is the number of arcs incident on it.

If (m,n) is an arc in a graph G=(N,A), it can be said that node m is adjacent to node n. The adjacency relation is symmetric for an undirected graph. If m is adjacent to n in a directed graph, it can be written m→n.

A path of length k from a node m to a node m' in a graph G=(N,A) is a sequence ⟨ $n_0, n_1, n_2, \ldots, n_k$ ⟩ of nodes such that m=$n_0$, m'=$n_k$, and ($n_{i-1}, n_i$)∈A for i=1, 2, . . . , k. The length of the path is the number of arcs in the path. The path contains the nodes $n_0, n_1, n_2, \ldots, n_k$ and the arcs ($n_0, n_1$), ($n_1, n_2$), . . . , ($n_{k-1}, n_k$). (There is always a 0-length path from m to m). If there is path p from m to m', it can be said that m' is reachable from m via p. A path is simple if all nodes in the path are distinct.

A subpath of path p=⟨ $n_0, n_1, n_2, \ldots, n_k$ ⟩ is a contiguous subsequence of its nodes. That is, for any 0≤i≤j≤k, the subsequence of nodes ⟨ $n_i, n_{i+1}, \ldots, n_j$ ⟩ is a subpath of p.

In an undirected graph, a path ($n_0, n_1, n_2, \ldots, n_k$) forms a cycle if k≥3, $n_0=n_k$, and $n_1, n_2, \ldots, n_k$ are distinct. A graph with no cycles is acyclic.

An undirected graph is connected if every pair of nodes is connected by a path. The connected components of a graph are the equivalence classes of nodes under the "is reachable from" relation. An undirected graph is connected if it has exactly one connected component, that is, if every node is reachable from every other node.

It can be said that a graph G'=(N',A') is a subgraph of G=(N,A) if N'⊆N and A'⊆A. Given a set N'⊆N, the subgraph of G induced by N' is the graph G'=(N',A'), where A'{(m=n)∈A: m,n∈N'}.

To establish a sign convention for flow in a gas pipeline network represented by an undirected graph, it is necessary to designate one end of each pipe arc as an "inlet" and the other end as an "outlet":

$(n,j) \in A_{in}$ Inlet of arc j intersects node n $(n,j) \in A_{out}$ Outlet of arc j intersects node n This assignment can be done arbitrarily, as our invention allows for flow to travel in either direction. By convention, a flow has a positive sign if the gas is flowing from the "inlet" to the "outlet", and the flow has a negative sign if the gas is flowing from the "outlet" to the "inlet".

Some nodes in a network are associated with a supply for the gas and/or a demand for the gas. Nodes associated with the supply of a gas could correspond to steam methane reformers in a hydrogen network; air separation units in an atmospheric gas network; or gas wells or delivery points in a natural gas network. Nodes associated with a demand for the gas could correspond to refineries in a hydrogen network; factories in an atmospheric gas network; or receipt points in a natural gas network.

A set of mathematical equations govern flows and pressures within a gas pipeline network. These equations derive from basic physical principles of the conservation of mass and momentum. The mathematical constraints associated with a network flow solution are described below.

Node Mass Balance

The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

The left-hand side of the equation represents the flow leaving a node, as $d_n$ is the customer demand associated with the node. The term $\sum_{j|(n,j) \in A_{in}} q_j$ represents the flow associated with pipes whose "inlet" side is connected to the node. If the flow $q_j$ is positive, then it represents a flow leaving the node. The right-hand side of the equation represents the flow entering a node, as $s_n$ is the plant supply associated with the node. The term $\sum_{j|(n,j) \in A_{out}} q_j$ represents the flow associated with pipe segments whose "outlet" side is connected to the node. If the flow term $q_j$ is positive, then it represents a flow entering the node.

Node Pressure Continuity

The node pressure continuity equations require that the pressure at the pipe ends which is connected to a node should be the same as the pressure of the node.

$p_j^{in} = p_n^{node} \forall (n,j) \in A_{in}$ $p_j^{out} = p_n^{node} \forall (n,j) \in A_{out}$ Pipe Pressure Drop The relationship between the flow of a gas in the pipe is nonlinear. A commonly used equation representing the nonlinear pressure drop relationship for gas pipelines is presented here. Other nonlinear relationships have been used elsewhere, and such other nonlinear relationships may also be used in connection with embodiments of the present invention.

This nonlinear pressure drop equation for gases in cylindrical pipelines is derived based on two assumptions. First, it is assumed that the gas in the pipeline network is isothermal (the same temperature throughout). This is a reasonable assumption because pipelines are often buried underground and there is excellent heat transfer between the pipeline and the ground. Under the isothermal assumption, an energy balance on the gas in the pipeline yields the following equation:

$$(p_j^{in})^2 - (p_j^{out})^2 = q_j|q_j|\frac{4ZRT}{M_w \pi^2 D_j^4}\left[\frac{4f_j L_j}{D_j} + 2\ln\left(\frac{p_j^{in}}{p_j^{out}}\right)\right]$$

For gas pipelines, because the pipe lengths are large relative to the diameters, the term $$\frac{4f_j L_j}{D}$$

is so much greater than the term $$2\ln\left(\frac{p_j^{in}}{p_j^{out}}\right)$$

that the latter term can be neglected. Under this assumption, then the nonlinear pressure drop relationship reduces to:

$(p_j^{in})^2 (p_j^{out})^2 = \alpha q_j |q_j|$ with $$\alpha = \frac{16 Z R f_j T_{ref} L_j}{M_w \pi^2 D_j^5}$$

where Z is the compressibility factor for the gas, which in most pipelines can be assumed to be a constant near 1; R is the universal gas constant; $T_{ref}$ is the reference temperature; $L_j$ is the length of the pipeline segment; and the term $f_j^e$ is a friction factor for a pipe segment, which varies weakly based on the Reynolds number of flow in the pipe, and for most gas pipelines is in the range 0.01-0.08. Below is provided an explicit formula for the friction factor in terms of the Reynold's number. The dimensionless Reynold's number is defined as $$Re_j = \frac{4|q_j|}{\pi D_j \mu},$$

where μ is the gas viscosity.

If the flow is laminar ($Re_j^e$<2100) then the friction factor is $$f_{j,L} = \frac{64}{Re_j}$$

If the flow is turbulent ($Re_j^e$>4000), then the friction factor may be determined using the implicit Colebrook and White equation:

$$\frac{1}{\sqrt{f_{j,TR}}} = -2\log_{10}\left(\frac{\epsilon}{3.71 D} + \frac{2.51}{Re_j \sqrt{f_j}}\right).$$

An explicit expression for the friction factor for turbulent flow that is equivalent to the Colebrook and White equation is $$f_{j,TR} = \frac{1}{[c[W_0(e^{a/bc}/bc)] - a/b]^2}$$

where $$a = \frac{\epsilon}{3.71\,D},\ b = \frac{2.51}{Re},\ \text{and}\ c = \frac{2}{\ln(10)} = 0.868589$$

and $W_0(\cdot)$ is the principal Lambert-W function. See (More, A. A. (2006). Analytical solutions for the Colebrook and White equation and for pressure drop in ideal gas flow in pipes. Chemical engineering science, 61(16), 5515-5519) and (Brkic, D. (2009). Lambert W-function in hydraulics problems. In MASSEE International Congress on Mathematics MICOM, Ohrid.).

When the Reynolds number is between 2100 and 4000, the flow is in a transition range between laminar and turbulent flow and the accepted approach in the literature is to interpolate the friction factor between the laminar and the turbulent value, based on the Reynolds number, as follows:

$$f_{j,TS} = f_{j,L|2100}\beta + f_{j,TF|4000}(1-\beta)$$

with $\beta = (4000 - Re_j)/(4000 - 2100)$.

Typical Design Parameters for Gas Pipeline Networks

Mainline natural transmission pipes are usually between 16 and 48 inches in diameter. Lateral pipelines, which deliver natural gas to or from the mainline, are typically between 6 and 16 inches in diameter. Most major interstate pipelines are between 24 and 36 inches in diameter. The actual pipeline itself, commonly called the 'line pipe', consists of a strong carbon steel material, with a typical roughness of 0.00015 feet. Thus, the relative roughness for natural gas transmission pipelines is typically in the range 0.00005 to 0.0003 and the friction factor is in the range 0.01 to 0.05 under turbulent flow conditions.

Hydrogen distribution pipelines typically have a diameter in the range 0.3-1.2 feet, and a typical roughness of 0.00016 feet. Thus, the relative roughness for hydrogen transmission pipelines is typically in the range 0.0001 to 0.0005 and the friction factor is in the range 0.012 to 0.05 under turbulent flow conditions.

Figure 2:
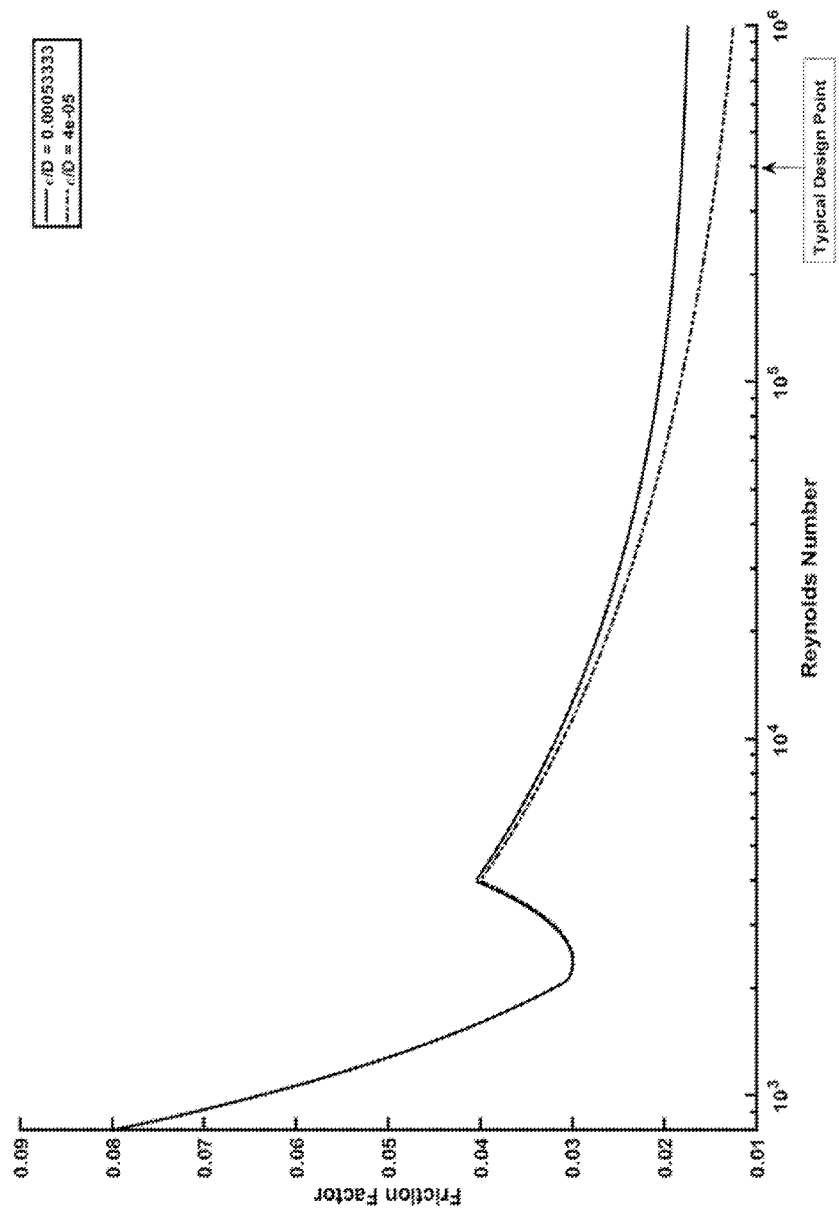
FIG. 2 shows the typical range of Reynolds numbers and friction factors for gas pipeline networks.

For gas pipeline networks, a typical design Reynold's number is 400,000. FIG. 2 shows the typical range of Reynold's numbers and the associated friction factors for gas pipeline networks.

Establishing Bounds on the Flows in Pipe Segments

A key enabler for the efficient computation of network flow solutions is the linearization of the nonlinear pressure drop relationship. To produce an accurate linearization of the pressure drop relationship for pipe segments, it is critical to bound the range of flow rates for each pipe segment. In examples below, linearization based on tightly bounded flow rates is called a tight linearization.

Figure 3:
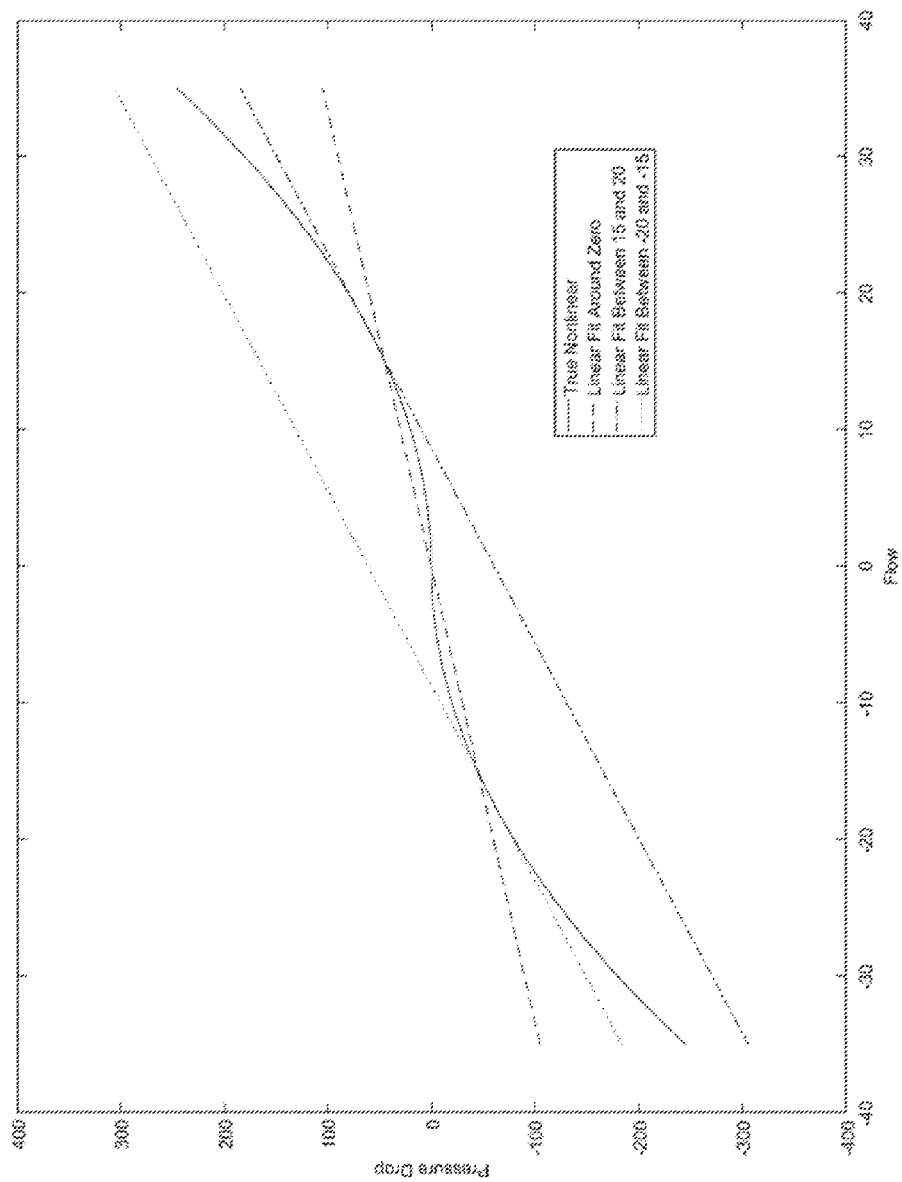
FIG. 3 shows the nonlinearity of the relationship between flow and pressure drop.

FIG. 3 illustrates the nonlinear relationship between pressure drop and flow. The true nonlinear relationship is indicated by the solid line. If one approximates the true nonlinear relationship with a linear fit centered around zero, the linear fit severely underestimates the pressure drop for flow magnitudes exceeding 20. If one does a linear fit of the true pressure drop relationship in the range of flows between 15 and 20, the quality of the pressure drop estimate for negative flows is very poor. If one does a linear fit of the true pressure drop relationship in the range between −20 and −15 MMSCFD, the pressure drop estimate for positive flows is very poor.

Bounds on flow rates can be determined using mass balances and bounds on production rates for plants and demand for customers, even in the absence of any assumptions about pressure constraints and pressure drop relationships. However, in the presence of energy consumption constraints at a plant, the bounds on production rates for plants are determined in part by energy consumption constraints. Hence, before the flow rates in pipes can be bound, the production rates at the plants must first be bound using the energy consumption constraints.

A energy consumption constraint typically takes the form of $$\sum_{t=1}^{T} y_{n,t} \leq nom_n$$

where t is an index for a time period (typically an hourly period), T is the period of time over which the energy consumption constraint is applicable (typically 24 hours), and $nom_n$ is a nomination quantity for the energy. In some cases, the energy consumption constraint may take the form of a lower bound on the quantity of energy consumed, $\sum_{t=1}^{T} \gamma_{n,t} \geq nom_n$, rather than an upper bound.

In order to use an energy consumption constraint to bound the production rate at that plant, it is necessary to have a model that relates energy consumption to industrial gas production. This model could be a linear model, such as $$\gamma_{n,t} = g_n s_{n,t} + w_{n,t}$$

where $g_n$ is the gain relating industrial gas production to energy consumption, and $w_{n,t}$ is a disturbance term. A linear model of this form may be developed using a transfer function model. The use of transfer function models is well known, but here in combination with other elements the transfer function models allow us to find a network flow solution that will meet energy consumption constraints with high confidence.

Substituting this linear model into the typical energy consumption constraint, the following results:

$$\sum_{t=1}^{T} g_n s_{n,t} + w_{n,t} \leq nom_n^{max}.$$

It is often the case that it is desirable to find a network flow solution at a time period T part of the way into the nomination period, where some amount of energy has already been consumed. Assuming that actual energy consumption has been measured, the energy consumption constraint takes the form $$\sum_{t=1}^{\tau-1} y_t + \sum_{t=\tau}^{T} (g_n s_{n,t} + w_{n,t}) \leq nom_n^{min}$$

It is now explained how to use this energy consumption constraint in the following linear program to find the maximum production rate at a particular plant m at a particular time t (here it assumed that all nominations are upper bounds):

| GIVEN | |
|---|---|
| $d_{n,t}$ $\forall n \in N, t \in \{\tau, \ldots T\}$ | Demand rate in node n |
| $\tau$ | Current time |
| $y_t$ $\forall t \in \{1, \ldots, \tau - 1\}$ | Historical energy consumption |
| CALCULATE | |
| $q_{j,t}$ $\forall j \in A, t \in \{\tau, \ldots, T\}$ | Flow rate in arcs |
| $s_{n,t}$ $\forall n \in S, t \in \{\tau, \ldots, T\}$ | Production rate in supply node |
| IN ORDER TO MAXIMIZE | |
| $s_{m,t}^{max} = s_{m,t}$ | |
| SUCH THAT | |
| $d_{n,t} + \Sigma_{j\|(n,j) \in A_{in}} q_{j,t} = \Sigma_{j\|(n,j) \in A_{out}} q_{j,t} +$ $s_{n,t}$ $\forall n \in N, t \in \{\tau, \ldots T\}$ | Node mass balance |
| $\Sigma_{t-1}^{\tau-1} + \Sigma_{t=\tau}^{T}(g_n s_{n,t} + w_{n,t}) \le$ $nom_n$ $\forall n \in S$ | Energy consumption constraints for production plants |

A similar linear program can be used to find the minimum production rate at a particular plant n at a particular time t:

| GIVEN | |
|---|---|
| $d_{n,t}$ $\forall n \in N, t \in \{\tau, \ldots T\}$ | Demand rate in node n |
| $\tau$ | Current time |
| $y_t$ $\forall t \in \{1, \ldots, \tau - 1\}$ | Historical energy consumption |
| CALCULATE | |
| $q_{j,t}$ $\forall j \in A, t \in \{\tau, \ldots, T\}$ | Flow rate in arcs |
| $s_{n,t}$ $\forall n \in S, t \in \{\tau, \ldots, T\}$ | Production rate in supply node |
| IN ORDER TO MINIMIZE | |
| $s_{m,t}^{min} = s_{m,t}$ | |
| SUCH THAT | |
| $d_{n,t} + \Sigma_{j\|(n,j) \in A_{in}} q_{j,t} = \Sigma_{j\|(n,j) \in A_{out}} q_{j,t} +$ $s_{n,t}$ $\forall n \in N, t \in \{\tau, \ldots T\}$ | Node mass balance |
| $\Sigma_{t-1}^{\tau-1} + \Sigma_{t=\tau}^{T}(g_n s_{n,t} + w_{n,t}) \le$ $nom_n$ $\forall n \in S$ | Energy consumption constraints for production plants |

Having found the minimum and maximum production rate at each plant at each time, we define the minimum and maximum production rate as, respectively:

$$s_n^{min} = \min_{t=\tau,\ldots,T} s_{n,t}^{min},$$

and $$s_n^{max} = \max_{t=\tau,\ldots,T} s_{n,t}^{max}.$$

Figure 4:
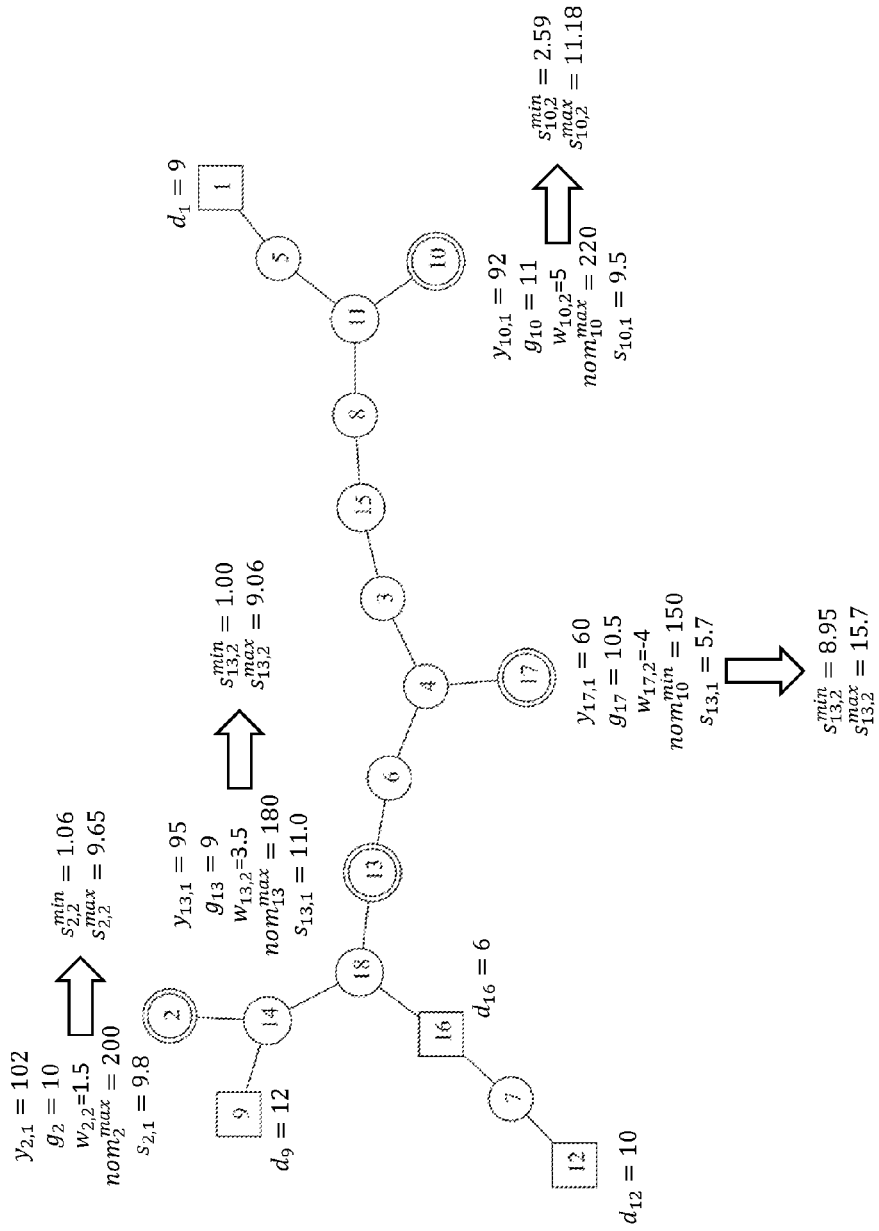
FIG. 4 illustrates how energy consumption constraints are used to bound the minimum and maximum production rates at plants.

An example is now provided to illustrate how energy consumption constraints for production plants in a gas pipeline network are used to bound the minimum and maximum production rate for each plant. FIG. 4 is a depiction of an unsigned graph which represents a gas pipeline network. Production plants are represented by double circles, customer demand nodes are represented by squares, and other junctions in the pipeline network are represented by single circles. Pipe segments in the network are represented as arcs connecting the nodes. In this example network, there are four production plants (at nodes 2, 10, 13, and 17) and four customers (at nodes 1, 9, 12, 16).

For the sake of simplicity, we consider a situation where there is a 2-hour nomination period for the feedgas for each plant. The first hour has already passed, and thus we have measurements of the feedgas consumption for each plant for this first hour. At plant 2, the feedgas consumption was 102 kg; at plant 10, the feedgas consumption was 92 kg; at plant 13, the feedgas consumption was 95 kg; and at plant 17, the feedgas consumption was 60 kg. The maximum feedgas consumption for the two-hour period for plant 2 is 200 kg; the maximum feedgas consumption for the two hour period for plant 10 is 220 kg; the maximum feedgas consumption for the two hour period for plant 13 is 180 kg; and the maximum feedgas consumption for the two hour period for plant 17 is 150 kg.

In the second hour of the demand period, customer demand at node 1 is 9 kg/hr; customer demand at node 9 is 12 kg/hr; customer demand at node 12 is 10 kg/hr; and customer demand at node 16 is 6 kg/hr.

A linear model relates the consumption of feedgas to the production of the industrial gas. For plant 2, the model is $$\gamma_{2,2} = q_2 s_{2,2} + w_{2,2}$$

with $g_2 = 10$, and $w_{2,2} = 1.5$ kg/hr.

The parameters for the energy consumption models for other plants are show in FIG. 4.

It is now illustrated how the energy consumption constraints are used to bound production rates for each plant in the second hour of the nomination period. To find the maximum production rate at hour 2 for plant 2, the following linear program can be solved:

| GIVEN | |
|---|---|
| $d_{n,t}$ $\forall n \in N, t \in \{2\}$ | Demand rate in node n |
| $y_t$ $\forall t \in \{2\}$ | Historical energy consumption |
| CALCULATE | |
| $q_{j,t}$ $\forall j \in A, t \in \{2\}$ | Flow rate in arcs |
| $s_{n,t}$ $\forall n \in S, t \in \{2\}$ | Production rate in supply node |
| IN ORDER TO MAXIMIZE | |
| $s_{2,2}^{max} = s_{2,2}$ | |
| SUCH THAT | |
| $d_{n,t} + \Sigma_{j\|(n,j) \in A_{in}} q_{j,t} = \Sigma_{j\|(n,j) \in A_{out}} q_{j,t} +$ $s_{n,t}$ $\forall n \in N, t \in \{2\}$ | Node mass balance |
| $y_{n,1} + (g_n s_{n,2} + w_{n,2}) \le$ $nom_n$ $\forall n \in \{2,10,13\}$ | |
| $y_{n,1} + (g_n s_{n,2} + w_{n,2}) \ge$ $nom_n$ $\forall n \in \{17\}$ | |

Similar linear programs are used to solve for the minimum production rate at plant 2, as well as the minimum and maximum production rates at each of the other plants. A total of eight linear programs are formulated and solved.

The results show that the minimum and maximum production rates at plant 2 in the second hour are 1.06 and 9.65 kg/hr, respectively. It can be verified that the maximum production rate is consistent with the energy consumption constraint, as follows:

$$\gamma_{2,1} + (g_2 s_{2,2}^{max} + w_{2,2}) = 102 + (10*9.64 + 1.55) = 199.95 \le 200 = nom_n$$

Bounds on the production rates for other plants are shown in FIG. 4.

Having bounded the production rate for each plant based on an energy consumption constraint, the flows in pipeline segments can now be bound. One method for bounding flows in pipeline segments based on mass balances is to formulate and solve a number of linear programs. For each pipe segment, one linear program can be used to determine the minimum flow rate in that segment and another linear program can be used to determine the maximum flow rate in that segment.

A method of bounding the flow rate in pipeline segments which is simple and computationally more efficient than the linear programming method is presented.

For the pipe segment of interest (assumed to not be in a graph cycle), the pipeline network is bisected into two subgraphs at the pipe segment of interest: a "left" subgraph and a "right" subgraph associated with that pipe. Formally, the left subgraph $L_j$ associated with pipe j is the set of nodes and arcs that are connected with the inlet node of pipe j once the arc representing pipe j is removed from the network. Formally, the right subgraph $R_j$ associated with pipe j is the set of nodes and arcs that are connected with the outlet node of pipe j once the arc representing pipe j is removed from the network. Given the bisection of the flow network into a left subgraph and a right subgraph, it is then possible to calculate the minimum and maximum signed flow through pipe segment j, based on potential extremes in supply and demand imbalance in the left subgraph and the right subgraph.

To bound the flow rate in each pipeline segment, some quantities are defined describing the imbalance between supply and demand in the left and right subgraphs. The minimum undersupply in the left subgraph for pipe j is defined as $s_{L_j}^{min} = (\Sigma_{n \in L} s_n^{min}) - (\Sigma_{n \in L} d_n)$. The minimum unmet demand in the right subgraph for pipe j is defined as $d_{R_j}^{min} = (\Sigma_{n \in R} d_n) - (\Sigma_{n \in R} s_n^{max})$. The maximum oversupply in the left subgraph for pipe j is defined as $s_L^{max} = (\Sigma_{n \in L} s_n^{max}) - (\Sigma_{n \in L} d_n)$. The maximum unmet demand in the right subgraph for pipe j is defined as $d_R^{max} = (\Sigma_{n \in R} d_n) - (\Sigma_{n \in R} s_n^{min})$.

Given the definitions above, the minimum and maximum feasible signed flow in the pipe segment are given by:

$$q_j^{min} = \max\{s_{L_j}^{min}, d_{R_j}^{min}\},$$

$$q_j^{max} = \min\{s_{L_j}^{max}, d_{R_j}^{max}\}.$$

The equation for $q_j^{min}$ indicates that this minimum (or most negative) rate is the maximum of the minimum undersupply in the left subgraph and the minimum unmet demand in the right subgraph. The equation for $q_j^{max}$ indicates that this maximum (or most positive) rate is the minimum of the maximum oversupply in the left subgraph and the maximum unmet demand in the right subgraph.

The equations in the previous paragraph for calculating $q_j^{min}$ and $q_j^{max}$ can be derived from the node mass balance relationship, as follows. The node mass balance relationship, which was previously introduced, is $$d_n + \sum_{j|(n,j) \in A_{in}} q_j = \sum_{j|(n,j) \in A_{out}} q_j + s_n.$$

Consider the left subgraph associated with pipe j. The left subgraph contains the node connected to the inlet of pipe j. Consider collapsing the entire left subgraph into the single node connected to the inlet of pipe j. Then, $$q_j^{in} = \sum_{n \in L_j} s_n - d_n$$

An upper bound for the inlet flow is $q_j^{in} \leq \Sigma_{n \in L_j} s_n^{max} - d_n$, and a lower bound for the inlet flow is $q_j^{in} \geq \Sigma_{n \in L_j} s_n^{min} - d_n$. Similarly, an upper bound for the outlet flow is $q_j^{out} \leq \Sigma_{n \in R_j} d_n - s_n^{min}$ and a lower bound is $q_j^{out} \geq \Sigma_{n \in R_j} d_n - s_n^{max}$.

At steady state, the pipe inlet flow equals the outlet flow and $$\sum_{n \in L_j} s_n^{min} - d_n \leq \sum_{n \in R_j} d_n - s_n^{max} \leq q_j^{in} =$$

$$q_j^{out} = q_j \leq \sum_{n \in R_j} d_n - s_n^{min} \leq \sum_{n \in L_j} s_n^{max} - d_n.$$

Equivalently, $$\max\left\{\sum_{n \in L_j} s_n^{min} - d_n, \sum_{n \in R_j} d_n - s_n^{max}\right\} \leq q_j^{in} =$$

$$q_j^{out} = q_j \leq \min\left\{\sum_{n \in R_j} d_n - s_n^{min}, \sum_{n \in L_j} s_n^{max} - d_n\right\}$$

or $$q_j^{min} = \max\{s_{L_j}^{min}, d_{R_j}^{min}\} \leq = q_j \leq \min\{s_{L_j}^{max}, d_{R_j}^{max}\} = q_j^{max},$$

which completes the proof.

The bisection method for bounding flow rates in pipe segments is illustrated in the same example flow network, depicted in FIG. 4, which was used to illustrate how to use energy consumption constraints to bound plant production rates.

Figure 5:
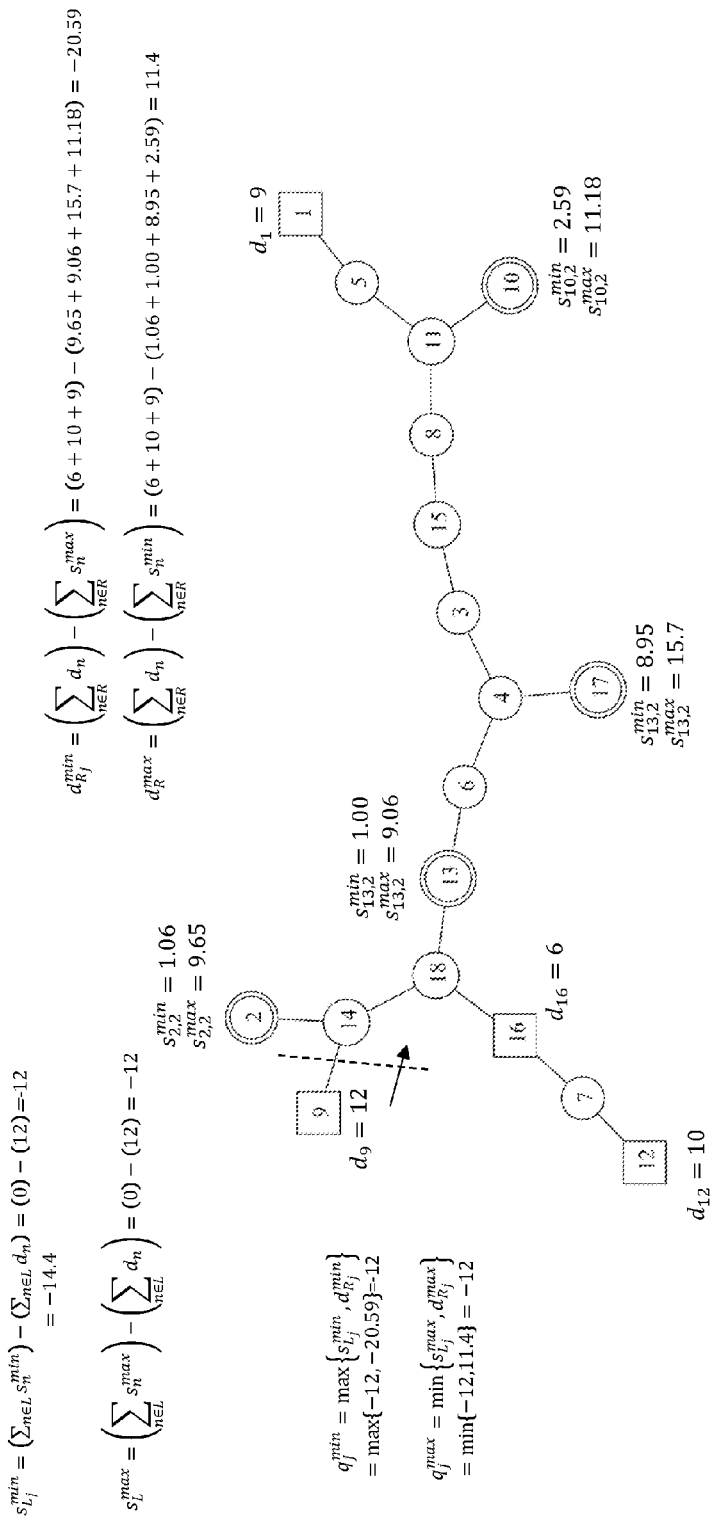
FIG. 5 is an example which illustrates the bisection method for bounding flows in pipes.

FIG. 5 shows how the network bisection method is used to bound the flow rate in the pipe segment between nodes 9 and 14. The result is that the minimum and maximum flow rate is −12 kg/hr, which represents a flow of 12 kg/hr in the direction from node 14 to node 9. By our sign convention, a flow is negative when going from a higher numbered node to a lower numbered node. As it should be, the minimum and maximum flow rate is consistent with the customer demand at node 9, which is 12 kg/hr.

Figure 6:
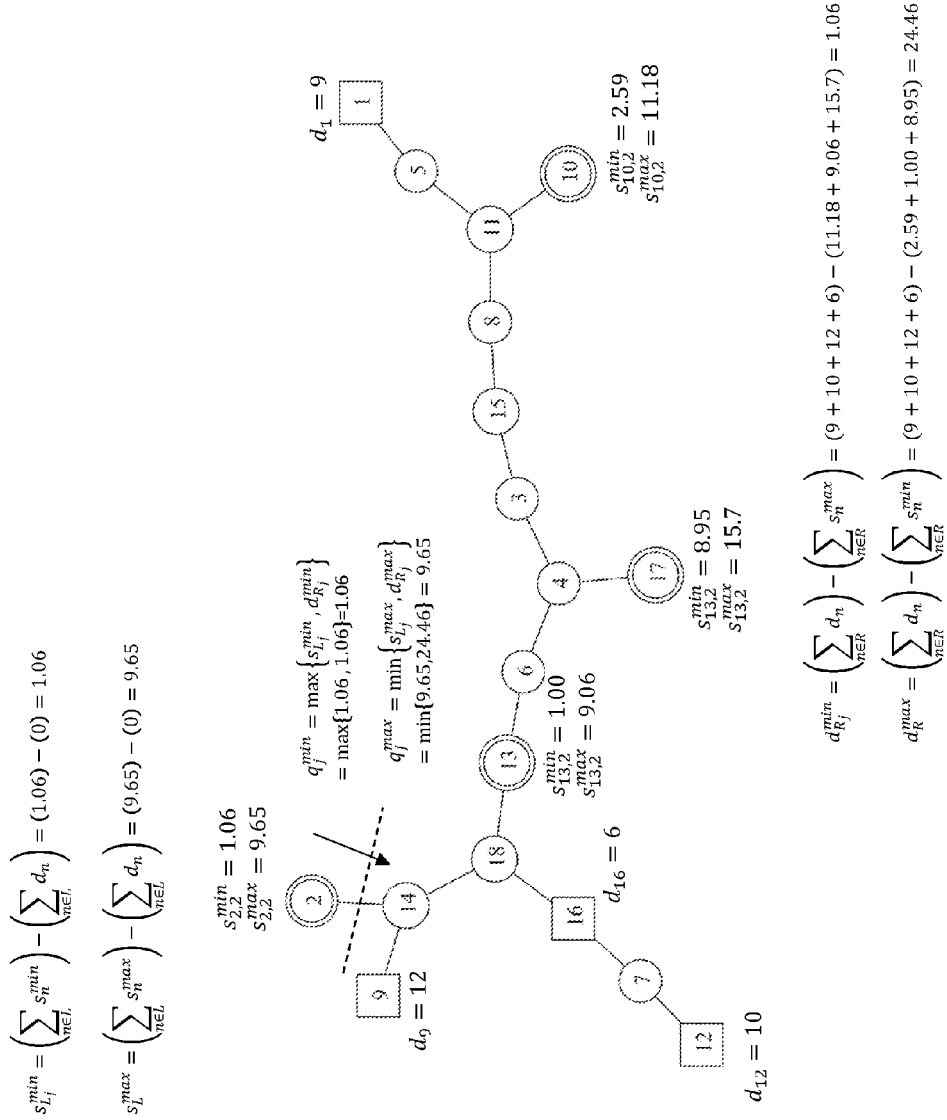
FIG. 6 is a second example which illustrates the bisection method for bounding flows in pipes.

FIG. 6 shows how the network bisection method is used to bound the flow rate in the pipe segment between nodes 2 and 14. The result is that the minimum and maximum flow rate are 1.06 kg/hr and 9.65 kg/hr, respectively. By our sign convention, a flow is positive when going from a lower numbered node to a higher numbered node. As it should be, the flow is in a direction reading away from the plant. In addition, the minimum and maximum flows in the pipe correspond to the minimum and maximum production rate of the plant, as calculated from the energy consumption constraints.

Figure 7:
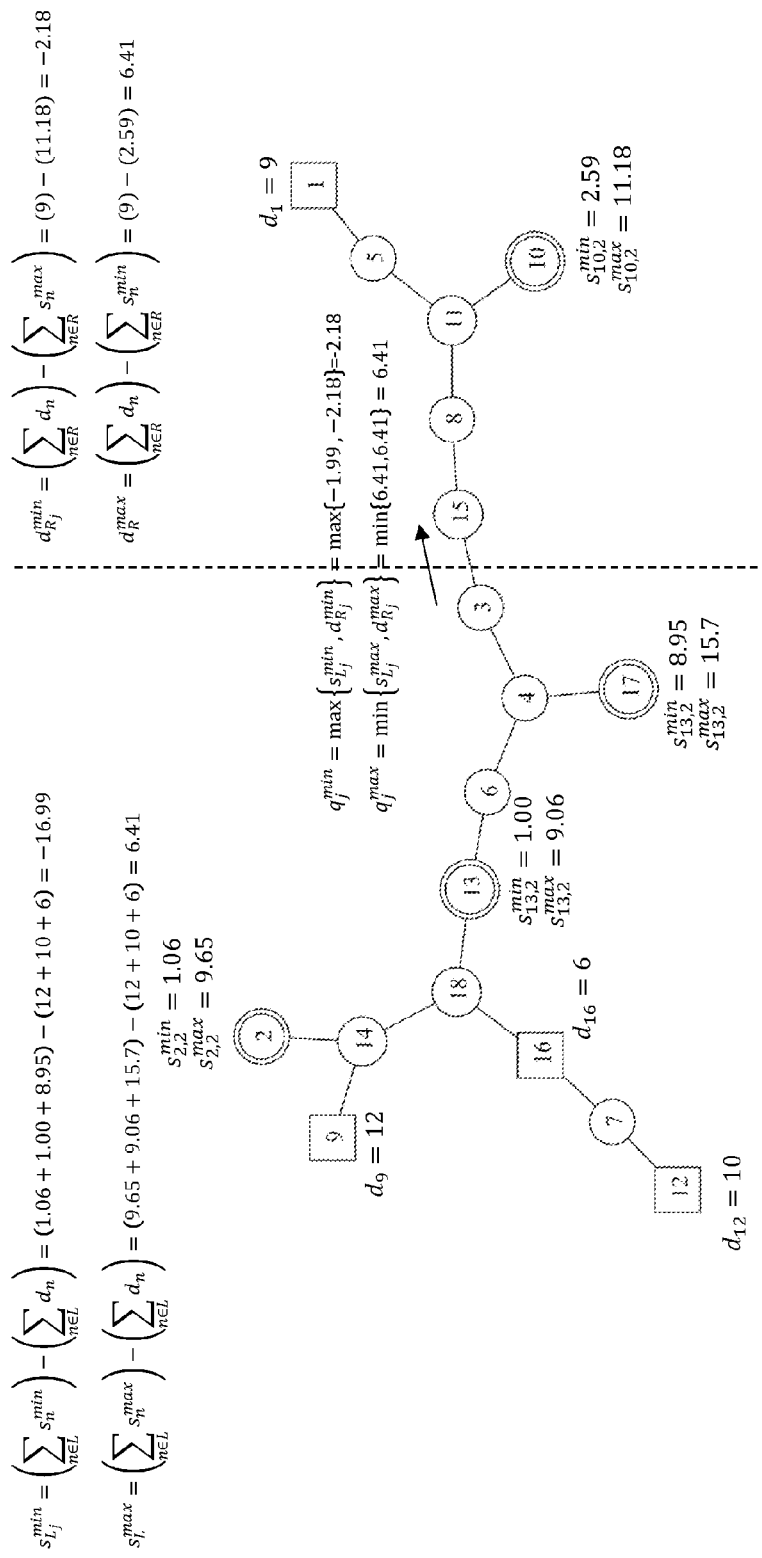
FIG. 7 is a third example illustrating the network bisection method for bounding flows in pipes.

FIG. 7 shows how the network bisection method is used to bound the flow rate in the pipe segment between nodes 3 and 15. The result is that the minimum and maximum flow rate are −2.18 kg/hr and 6.41 kg/hr, respectively. By our sign convention, a flow is positive when going from a lower numbered node to a higher numbered node. In this case, flow can go in either direction.

Figure 8:
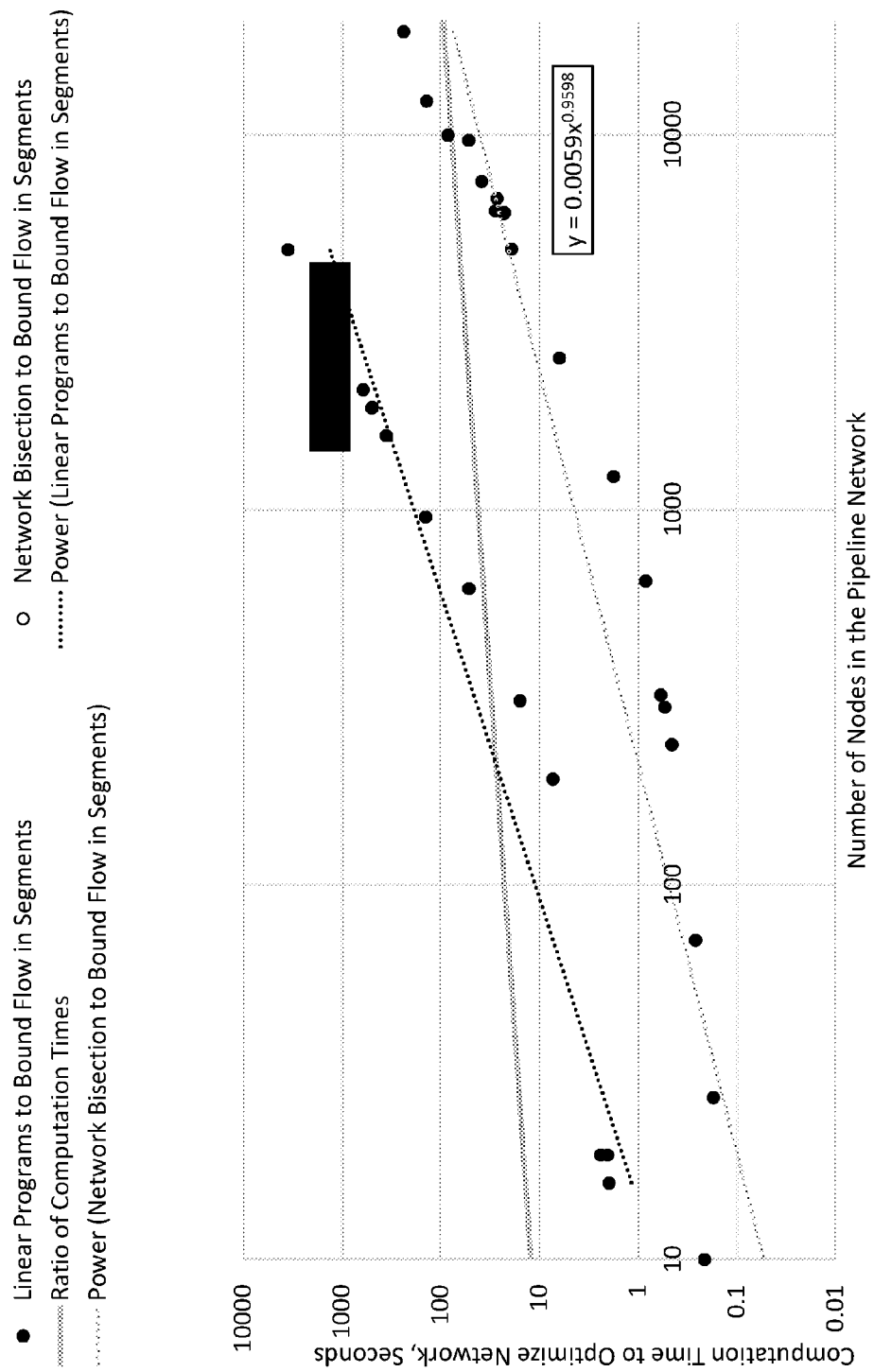
FIG. 8 shows a comparison of the computation times for two different methods for bounding flow in pipe segments.

FIG. 8, which contains data from computational experiments performed using Matlab on a computer with an Intel Core I 2.80 GHz processor, shows that the network bisection method for bounding the flow in pipeline segments is between 10 and 100 times faster than the linear programming method.

Finding a Linear Pressure-Drop Model

The next step in the invention is to linearize the nonlinear pressure drop relationship for each pipe, based on the flow bounds established for each pipe. This can be done analytically (if the bounded flow range is narrow enough that the friction factor can be assumed to be constant over the flow range), or numerically (if the bounded flow range is sufficiently wide that the friction factor varies significantly over the flow range). The sections below describe how a linearization can be accomplished either analytically or numerically. We seek a linear pressure drop model of the form $$ps_j^{in} - ps_j^{out} = m_j q_j + b_j \, \forall j \in P.$$

Note that the fact that we have bounded the flow range is critical to produce a good linear model. Without these bounds, we might produce a naïve linear model which is based on linearizing the nonlinear relationship about zero with a minimum and maximum flow magnitude equal to the total network demand. As will be shown in examples below, this generally does not produce good network flow solutions.

Finding the Least-Squares Linear Pressure-Drop Model Analytically: Slope-Intercept Form If the bounded flow range is fairly narrow, then the friction factor as well as the nonlinear pressure drop coefficient $\alpha$ will be nearly constant and we may find an analytical solution for the least squares linear fit of the nonlinear pressure drop relationship.

Least squares solution for a linear model with $g = q_j^{min}$ and $h = q_j^{max}$ $$(m_j^*, b_j^*) = \underset{m,b}{\arg\min} \int_g^h (\alpha q |q| - mq - b)^2 \, dq$$

Evaluating the definite integral:

$$\int_g^h (\alpha q|q| - mq - b)^2 dq = b^2 h - b^2 q -$$

$$g^3 \left( \frac{m^2}{3} - \frac{2\alpha b \operatorname{sign}(g)}{3} \right) + h^3 \left( \frac{m^2}{3} - \frac{2\alpha b \operatorname{sign}(h)}{3} \right) - \frac{\alpha^2 g^5 \operatorname{sign}(g)^2}{5} +$$

$$\frac{\alpha^2 h^5 \operatorname{sign}(h)^2}{5} - bg^2 m + bh^2 m + \frac{\alpha g^4 m \operatorname{sign}(g)}{2} - \frac{\alpha h^4 m \operatorname{sign}(h)}{2}$$

This quantity is minimized when the partial derivatives with respect to b and m are simultaneously zero. These partial derivatives are $$\frac{\partial \int_g^h (\alpha q|q| - mq - b)^2 dq}{\partial b} =$$

$$2bh - 2bg - g^2 m + h^2 m + \frac{2ag^3 \operatorname{sign}(g)}{3} - \frac{2ah^3 \operatorname{sign}(h)}{3}$$

$$\frac{\partial \int_g^h (\alpha q|q| - mq - b)^2 dq}{\partial m} =$$

$$bh^2 - bg^2 - \frac{2g^3 m}{3} + \frac{2h^3 m}{3} + \frac{ag^4 \operatorname{sign}(g)}{2} - \frac{ah^4 \operatorname{sign}(h)}{2}$$

Setting the partial derivatives equal to zero, and solving for b and m, it is found that the form of the slope-intercept least squares linear model is:

$$b^* = -\frac{\begin{array}{l}(\alpha g^5 \operatorname{sign}(g) - \alpha h^5 \operatorname{sign}(h) - 8\alpha g^3 h^2 \operatorname{sign}(g) + \\ 8\alpha g^2 h^3 \operatorname{sign}(h) + \alpha g^4 h \operatorname{sign}(g) - \alpha g h^4 \operatorname{sign}(h))\end{array}}{(6(g-h)(g^2 - 2gh + h^2))}$$

$$m^* = \frac{\begin{array}{l}(\alpha g^4 \operatorname{sign}(g) - \alpha h^4 \operatorname{sign}(h) - \\ 2\alpha g^3 h \operatorname{sign}(g) + 2\alpha g h^3 \operatorname{sign}(h))\end{array}}{(g^3 - 3g^2 h + 3gh^2 - h^3)}$$

Finding the Least Squares Model Empirically: Slope-Intercept Model

If the bounded flow range for a pipe segments spans more than a factor of two, then the friction factor may vary significantly over that flow range and there is no analytical expression for the least-squares linear fit of the nonlinear pressure drop relationship. In this case, the preferred approach for developing a least-squares linear fit of the nonlinear pressure drop is a numerical approach.

This approach entails using numerical linear algebra to calculate the value of the slope and intercept using the formula.

$$\begin{bmatrix} m \\ b \end{bmatrix} = (Q^T Q)^{-1} Q^T y$$

where m is the slope of the line, b is the intercept of the line, Q is a matrix the first column of the matrix Q contains a vector of flow rates ranging from the minimum signed flow rate for the segment to the maximum signed flow rate for the segment, and the second column is a vector of ones.

$$Q = \begin{bmatrix} q_{min} & 1 \\ \vdots & \vdots \\ q_{max} & 1 \end{bmatrix}$$

The vector $y$ contains the pressure drop as calculated by the nonlinear pressure drop relationship, at flow rates ranging from the minimum signed flow rate to the maximum signed flow rate. Because the friction factor varies over this flow range, a different value of the nonlinear pressure drop relationship $\alpha$ may be associated with each row of the vector.

$$y = \begin{bmatrix} \alpha_{min} q_{min} |q_{min}| \\ \vdots \\ \alpha_{max} q_{max} |q_{max}| \end{bmatrix}$$

As an example, consider the following data from a nonlinear pressure drop model:

| Flow, kg/s | Change in squared pressure, Pa$^2$ |
|---|---|
| 2.0 | 7.7 |
| 3.0 | 12.1 |

-continued

| Flow, kg/s | Change in squared pressure, $Pa^2$ |
|---|---|
| 4.0 | 17.9 |
| 5.0 | 25.3 |
| 6.0 | 34.1 |
| 7.0 | 44.3 |

Given this data, $$q_{min} = 2.0, q_{max} = 7.0, Q = \begin{bmatrix} 2.0 & 1 \\ 3.0 & 1 \\ 4.0 & 1 \\ 5.0 & 1 \\ 6.0 & 1 \\ 7.0 & 1 \end{bmatrix}, \text{ and } y = \begin{bmatrix} 7.7 \\ 12.1 \\ 17.9 \\ 25.3 \\ 34.1 \\ 44.3. \end{bmatrix}.$$

Applying the formula $$\begin{bmatrix} m \\ b \end{bmatrix} = (Q^T Q)^{-1} Q^T y,$$

it is determined that the parameters of the least-squares linear fit are m=7.33 and b=−9.40.

Finding the Least Squares Model Numerically: A Slope Only Model

In some instances, if the flow range includes transition turbulent flow, includes laminar flow, or includes both turbulent and laminar flow regimes, there is no analytical expression for the least-squares linear fit of the nonlinear pressure drop relationship. In this case, the preferred approach for developing a least-squares linear fit of the nonlinear pressure drop is a numerical approach.

This approach involves calculating the value of the $$m = (q^T q)_{-1} q^T \gamma$$

where m is the slope of the line, q is a vector of flow rate values ranging from the minimum signed flow rate for the segment to the maximum signed flow rate for the segment $$q = \begin{bmatrix} q_{min} \\ \vdots \\ q_{max} \end{bmatrix}.$$

The vector γ contains the pressure drop as calculated by the nonlinear pressure drop relationship, at flow rates ranging from the minimum signed flow rate to the maximum signed flow rate. Since the friction factor varies over this flow range, a different value of the nonlinear pressure drop relationship α may be associated with each row of the vector $$y = \begin{bmatrix} \alpha_{min} q_{min} |q_{min}| \\ \vdots \\ \alpha_{max} q_{max} |q_{max}| \end{bmatrix}.$$

As an example, consider the following data from a nonlinear pressure drop model:

| Flow, kg/s | Change in squared pressure, $Pa^2$ |
|---|---|
| −3.0 | −24.2 |
| −2.0 | −7.5 |
| −1.0 | −1.0 |
| 0.0 | 0.0 |
| 1.0 | 1.0 |
| 2.0 | 7.5 |

Given this data, $$q_{min} = 2.0, q_{max} = 7.0, q = \begin{bmatrix} -3.0 \\ -2.0 \\ -1.0 \\ 0.0 \\ 1.0 \\ 2.0 \end{bmatrix}, \text{ and } y = \begin{bmatrix} -24.2 \\ -7.5 \\ -1.0 \\ 0.0 \\ 1.0 \\ 7.5 \end{bmatrix}.$$

Applying the formula $m=(q^T q)^{-1} q^T \gamma$, it is determined that the parameter of the least-squares linear fit is m=5.51.

Choosing the Most Appropriate Linear Model

Described herein are several methods for calculating the best linear fit of the nonlinear pressure drop relationship, given the minimum and maximum flow rates. Also described is how to find the best slope-only linear model, given the minimum and maximum flow rates. An open question is in which situations it is appropriate to use the slope/intercept model, and in which situations it is best to use the slope-only model. A key principle here is that the linear model should always give the correct sign for the pressure drop. In other words, for any linear model exercised over a bounded flow range, the sign of the predicted pressure drop should be consistent with the flow direction. Pressure should decrease in the direction of the flow. Note that the slope-only model has an intercept of zero, and thus the slope-only model will show sign-consistency regardless of the flow range. Thus, a slope-intercept model should be used unless there is a point in the allowable flow range where there would be a sign inconsistency; if a slope-intercept model would create a sign-inconsistency, then the slope-only model should be used.

Identifying the Nonlinear Pressure Drop Coefficient from Experimental Data

The methods described above for creating a linearization of the nonlinear pressure drop relationship rely on knowledge of the nonlinear pressure drop parameter α.

In some cases, the nonlinear pressure drop coefficient α may be calculated directly using the formula $$\alpha = \frac{16 Z R f_j T_{ref} L_j}{M_w \pi^2 D_j^5}$$

if the length of the pipe segment, the diameter of the pipe segment, the friction factor, and the gas temperature are known. In other cases, these quantities may not be known with sufficient accuracy. In such situations, a can still be estimated if historical data on flow rates and pressure drops for the pipe are available.

If historical data on flow rates and pressure drops for a pipe are available, with a minimum signed flow rate of $q_{min}=g$ and a maximum signed flow rate of $q_{max}=h$, then the first step in estimating a is to fit a line to the data $(p_j^{in})^2-$ $(p_j^{out})^2$ as a function of the flow rate q. The line of best slope is parameterized by a calculated slope m and intercept b.

Given a linear fit for data in slope-intercept form over a given flow range, it is now shown how to recover a least-squares estimate of the nonlinear pressure drop parameter α. The best estimate α*, given the flow range (g,h), the best slope estimate m, and the best intercept estimate b satisfies the least squares relationship $$\alpha^* = \underset{\alpha}{\operatorname{argmin}} \int_g^h (\alpha q|q| - mq - b)^2 \, dq$$

It can be shown that an equivalent expression for α* is as a function of the flow range (g,h), the best slope estimate m, and the best intercept estimate b is $$\alpha^* = \frac{20bg^3 \operatorname{sign}(g) - 20bh^3 \operatorname{sign}(h) + 15g^4 m \operatorname{sign}(g) - 15h^4 m \operatorname{sign}(h)}{12g^5 \operatorname{sign}(g)^2 - 12h^5 \operatorname{sign}(h)^2}$$

which is the formula that can be used to estimate α given historical data of pressure drop over a flow range.

Bounding the Error in the Linearized Pressure Predictions for the Pipeline Network Above, it is described how to linearize the pressure drop relationship for each pipe in the network by first bounding the range of flow rates which will be encountered in each pipe segment. In connection with an exemplary embodiment of the present invention, the linearized pressure drop models are used to calculate a network flow solution. Although the linearized pressure drop models fit the nonlinear models as well as possible, there will still be some error in the pressure estimates in the network flow solution relative to the pressures that would actually exist in the network given the flows from the network flow solution and the true nonlinear pressure drop relationships. To accommodate this error while still ensuring that pressure constraints are satisfied by the network flow solution, it is necessary to bound the error in the linearized pressure prediction at each node in the network.

To bound the error in the pressure prediction at each node in the network, first, the error in the prediction of the pressure drop is bound for each arc. For pipe arcs, this is done by finding the maximum absolute difference between the linear pressure drop model and the nonlinear pressure drop model in the bounded range of flows for the pipe segment. By definition, $$ps_j^{err} = \max_{q_j^{min} \le q \le q_j^{max}} |\alpha_j q|q| - m_j^* q - b_j^*| \forall \, j \in P.$$

For control arcs, the maximum error in the prediction of the change in pressure associated with the arc depends on the type of arc. Some control elements, such as valves in parallel with variable speed compressors, have the capability to arbitrarily change the pressure and flow of the fluid within certain ranges, and for these there is no error in the pressure prediction. Other types of control elements, such as nonlinear valves, may be represented by a linear relationship between pressure drop and flow based on the set valve position. For these, there may be a potential linearization error similar to that for pipes. In what follows, it is assumed without loss of generality that $ps_j^{err} = 0 \, \forall j \in C$.

Next, a known reference node r in the network is identified. This is a node where the pressure is known with some bounded error. Typically, the reference node is a node which is incident from a pressure control element arc. The maximum absolute pressure error for the reference value can be set to zero, or it can be set to some small value associated with the pressure tracking error associated with the pressure control element.

To compute the error associated with nodes in the network other than the reference node, the undirected graph representing the pipeline network is converted to a weighted graph, where the weight associated with each pipeline arc is the maximum absolute pressure error for the pipe segment. The shortest path is then found, in the weighted graph, between the reference node and any other target node.

In a shortest-path problem, given is a weighted, directed graph G=(N,A), with weight function w: A→R mapping arcs to real-valued weights. The weight of path p= $(n_0, n_1, \ldots, n_k)$ is the sum of the weights of its constituent arcs:

$$w(p) = \sum_{i=1}^{k} w(n_{i-1}, n_i).$$

The shortest-path weight is defined from n to m by $$\delta(m, n) = \begin{cases} \min\{w(p) : m \xrightarrow{p} n\} & \text{if there is a path from } m \text{ to } n \\ \infty & \text{otherwise.} \end{cases}$$

if there is a path from m to n, otherwise.

A shortest-path from node m to node n is then defined as any path p with weight w(p)=δ(m,n).

In the weighted graph used here, the weight function is the maximum absolute pressure prediction error associated with the pipe segment connecting the two nodes. To compute the shortest-path weight δ(m,n), an implementation of Dijkstra's algorithm can be used (see Ahuja, R. K., Magnanti, T. L., & Orlin, J. B. (1993). Network flows: theory, algorithms, and applications.) The maximum pressure error for the target node is the maximum pressure error for the reference node plus the shortest path distance between the reference node and the target node. In mathematical notation, $$ps_m^{err} = ps_r^{err} + \delta(r,m)$$

where the weight function for the shortest path is $w_j = ps_j^{err}$.

If a pipeline network has more than one pressure reference node $r_1, \ldots, r_n$, then one calculates the shortest path between each reference node and every other reference node. The pressure error is then bounded by the minimum of the quantity $ps_r^{err} + \delta(r,m)$ over all reference nodes:

$$ps_m^{err} = \min_{r \in \{r_1, \ldots, r_n\}} \{ps_r^{err} + \delta(r, m)\}.$$

Calculating a Network Flow Solution

Above, it is shown how to 1) bound the production rate at a plant based on energy consumption constraints, 2) bound the minimum and maximum flow rate for each pipe segment in a computationally efficient fashion; 3) compute an accurate linear approximation of the nonlinear pressure drop relationship given the bounded flow range; 4) bound the pressure prediction error associated with the linear approximation. Now it is described how to calculate a network flow solution, that is, to determine values of pressures for pipeline junctions and flows for pipeline segments which 1) satisfy constraints associated with the conservation of mass and momentum; 2) are consistent with bounds on the flow delivered to each customer, 3) satisfy pipeline pressure constraints with appropriate margin to accommodate errors associated with the linearization of the nonlinear pressure drop relationship, and 4) satisfy energy consumption constraints. The governing equations are summarized here.

Node Mass Balance

The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

Node Pressure Continuity

The node pressure continuity equations require that the pressure of all pipes connected to a node should be the same as the pressure of the node.

$$ps_j^{in} - ps_n^{node} = \forall (n,j) \in A_{in}$$

$$ps_j^{out} - ps_n^{node} = \forall (n,j) \in A_{out}$$

Linearized Pressure Drop Mode

It is shown how to develop a linear pressure drop model of the form $$ps_j^{in} - ps_j^{out} = m_j q_j + b_j.$$

Pressure Constraints at Nodes

At nodes in the pipeline network, there are minimum and maximum pressure constraints. These constraints must be satisfied with sufficient margin, namely $ps_n^{err}$, to allow for potential inaccuracy associated with the linearized pressure drop relationships:

$$ps_n^{min} + ps_n^{err} \leq ps_n^{node} \leq ps_n^{max} - ps_n^{err}, \forall n \in N.$$

This ensures that the pressures constraints will be satisfied even when the nonlinear pressure drop model is used to calculate network pressures based on the flow values associated with the network flow solution. Above, it is shown how to compute $ps_n^{err}$ using Dijkstra's algorithm for a certain weighted graph.

Energy Consumption Constraints

The following energy consumption constraint was developed above:

$$\sum_{t=1}^{\tau-1} y_t + \sum_{t=\tau}^{T} (g_n s_{n,t} + w_t) \leq nom_n.$$

Production Constraints

This constraint specifies the minimum and maximum production rate for each of the plants. These constraints were developed above using the energy consumption constraints.

$$s_n^{min} < s_n < s_n^{max}$$

Finally, we can formulate the following linear program to find a network flow solution:

| GIVEN | |
| --- | --- |
| $d_{n,t} \forall n \in N, t \in \{\tau, \ldots T\}$ | Demand rate in node n |
| $(m_j, b_j) \forall j \in P$ | Linearized pressure drop model for pipe j |
| $ps_n^{err} \forall n \in N$ | Maximum squared pressure error for node n, given linearized pressure drop models |
| $\tau$ | Current time |
| CALCULATE | |
| $q_{j,t} \forall j \in A, t \in \{\tau, \ldots, T\}$ | Flow rate in arcs |
| $s_{n,t} \forall n \in S, t \in \{\tau, \ldots, T\}$ | Production rate in supply node |
| $d_{n,t} \forall n \in D, t \in \{\tau, \ldots, T\}$ | Rate supplied to demand node |
| $ps_{n,t}^{node} \forall n \in N, t \in \{\tau, \ldots, T\}$ | Squared pressure at each node |
| $ps_{j,t}^{e} \forall j \in A, t \in \{\tau, \ldots, T\}$ | Squared pressure at the ends of each arc |
| SUCH THAT | |
| $d_{n,t} + \Sigma_{j|(n,j) \in A_{in}} q_{j,t} = \Sigma_{j|(n,j) \in A_{out}} q_{j,t} + s_{n,t} \forall n \in N, t \in \{\tau, \ldots T\}$ | Node mass balance |
| $ps_{j,t}^{in} = ps_{n,t}^{node} \forall (n,j) \in A_{in}, t \in \{\tau, \ldots T\}$ | Node pressure equality constraints |
| $ps_{j,t}^{out} = ps_{n,t}^{node} \forall (n,j) \in A_{out}, t \in \{\tau, \ldots T\}$ | Node pressure equality constraints |
| $ps_{j,t}^{in} - ps_{j,t}^{out} = m_j q_{j,t} + b_j \forall j \in P, t \in \{\tau, \ldots T\}$ | Linearized pressure drop model for pipes |
| $ps_n^{min} + ps_n^{err} \leq ps_{n,t}^{node} \leq ps_n^{max} - ps_n^{err}, \forall n \in N, t \in \{\tau, \ldots T\}$ | Pressure bounds with margin for error |
| $\Sigma_{t=1}^{\tau-1} y_t + \Sigma_{t=\tau}^{T} (g_n s_{n,t} + w_{n,t}) \leq nom_n, \forall n \in S, t \in \{\tau, \ldots T\}$ | Energy consumption constraint |

The above linear program can be quickly solved by a wide variety of linear programming solvers, including those in MATLAB, Gurobi, or CPLEX. Note that additional linear constraints, such as min or max flow rates in certain arcs, can easily be added to the above linear program. In addition, an objective function can be added such that a single unique flow solution can be identified based on criteria such as economic considerations. Note that because a network flow solution is being found that spans the entire energy consumption period, the objective can take into account flows throughout the time horizon.

As an example of finding a network flow solution with an objective function, consider the following linear program:

| GIVEN | |
| --- | --- |
| $d_{n,t} \forall n \in N, t \in \{\tau, \ldots T\}$ | Demand rate in node n |
| $(m_j, b_j) \forall j \in P$ | Linearized pressure drop model for pipe j |
| $ps_n^{err} \forall n \in N$ | Maximum squared pressure error for node n, given linearized pressure drop models |
| $\tau$ | Current time |
| CALCULATE | |
| $q_{j,t} \forall j \in A, t \in \{\tau, \ldots, T\}$ | Flow rate in arcs |
| $s_{n,t} \forall n \in S, t \in \{\tau, \ldots, T\}$ | Production rate in supply node |
| $d_{n,t} \forall n \in D, t \in \{\tau, \ldots, T\}$ | Rate supplied to demand node |
| $ps_{n,t}^{node} \forall n \in N, t \in \{\tau, \ldots, T\}$ | Squared pressure at each node |
| $ps_{j,t}^{e} \forall j \in A, t \in \{\tau, \ldots, T\}$ | Squared pressure at the ends of each arc |
| IN ORDER TO MINIMIZE | |
| $f(s_{n,t}) \forall n \in S, t \in \{\tau, \ldots, T\}$ | Objective function based on production level at each supply node over the remainder of the problem horizon. |

-continued

| | SUCH THAT |
|---|---|
| $d_{n,t} + \Sigma_{j\|(n,j)\in A_{in}} q_{j,t} = \Sigma_{j\|(n,j)\in A_{out}} q_{j,t} + s_{n,t} \; \forall \; n \in N, t \in \{\tau, \ldots T\}$ | Node mass balance |
| $ps_{j,t}^{in} = ps_{n,t}^{node} \; \forall (n,j) \in A_{in}, t \in \{\tau, \ldots T\}$ | Node pressure equality constraints |
| $ps_{j,t}^{out} = ps_{n,t}^{node} \; \forall (n,j) \in A_{out}, t \in \{\tau, \ldots T\}$ | Node pressure equality constraints |
| $ps_{j,t}^{in} - ps_{j,t}^{out} = m_j q_{j,t} + b_j \; \forall \; j \in P, t \in \{\tau, \ldots T\}$ | Linearized pressure drop model for pipes |
| $ps_n^{min} + ps_n^{err} \le ps_{n,t}^{node} \le ps_n^{max} - ps_n^{err}, \; \forall n \in N, t \in \{\tau, \ldots T\}$ | Pressure bounds with margin for error |
| $\Sigma_{t-1}^{\tau-1} y_t + \Sigma_{t=\tau}^{T}(g_n s_{n,t} + w_{n,t}) \le nom_n, \; \forall n \in S, t \in \{\tau, \ldots T\}$ | Energy consumption constraint |

Controlling the Gas Pipeline Network Using the Network Flow Solution

Once the network flow solution has been computed, it can be used to control the gas pipeline network. Flow control elements receive setpoints which are identified using the network flow solution. There are two representations of flow control elements in the undirected graph representation of the network. First, nodes associated with supply or demand are control elements, and the network flow solution indicates the supply or demand flow that should be associated with each plant or customer in the network. Second, in some networks, there are also control arcs (representing compressors, valves, or a combination of compressors in valves). The network flow solution indicates the flows and pressures that should be accomplished by these control elements.

Figure 9:
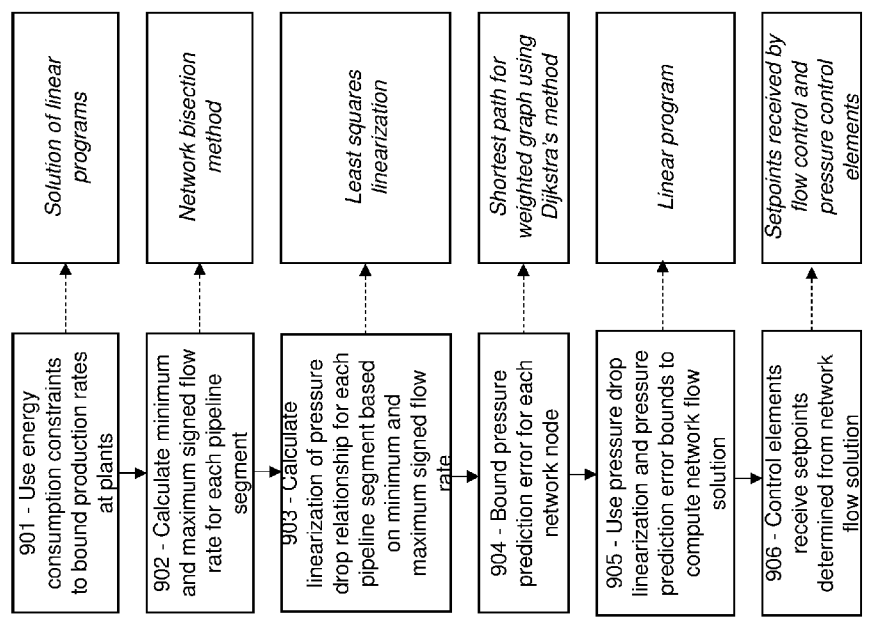
FIG. 9 is a flowchart illustrating a preferred embodiment of a method of the present invention.

FIG. 9 is a flow chart illustrating an exemplary method of the present invention. In step 901, energy consumption constraints are used to bound production rates at plants. In one embodiment, this is solved using linear programs. In step 902, the minimum and maximum signed flow rate is calculated for each pipeline segment. In some embodiments, this is accomplished using a network bisection method. In step 903, linearization of pressure drop relationship for each pipeline segment is calculated based on minimum and maximum signed flow rate. In some embodiments, this is accomplished using least squares linearization. In step 904, the pressure prediction error for each network node is bound. In some embodiments, this is accomplished using the shortest path for a weighted graph using Dijkstra's method. In step 905, the pressure drop linearization and pressure prediction error bounds are used to compute network flow solution. In some embodiments, this is accomplished using linear programming. In step 906, control elements (e.g., flow control and/or pressure control elements) of the pipeline network receive setpoints determined from network flow solution.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system for controlling flow of gas in an industrial gas pipeline network to satisfy energy consumption constraints at an industrial gas production plant, comprising:
    a gas pipeline network comprising at least one gas production plant, at least one gas receipt facility of a customer, a plurality of pipeline segments, a plurality of network nodes, and a plurality of control elements,
        wherein flow of gas within each of the plurality of pipeline segments is associated with a direction, the direction being associated with a positive sign or a negative sign;
    one or more controllers; and
    one or more processors configured to:
        calculate a minimum production rate and a maximum production rate at the gas production plant to satisfy a constraint on consumption of an energy input over a period of time, the minimum production rate and the maximum production rate comprising bounds on the production rate for the plant;
        use the bounds on the production rate for the plant to calculate a minimum signed flow rate and a maximum signed flow rate for each of the pipeline segments, the minimum signed flow rate and the maximum signed flow rate constituting flow bounds for each pipeline segment;
        linearize a nonlinear pressure drop relationship for each of the plurality of pipeline segments within the flow bounds to create a linear pressure drop model for each of the plurality of pipeline segments; and
        calculate a network flow solution, using the linear pressure drop model, comprising flow rates for each of the plurality of pipeline segments to satisfy demand constraints and pressures for each of the plurality of network nodes over the period of time to satisfy pressure constraints, the network flow solution being associated with control element setpoints;
    at least one of the controllers receiving data describing the control element setpoints; and controlling at least some of the plurality of control elements using the data describing the control element setpoints;
    wherein the one or more processors are further configured to calculate the minimum signed flow rate and the maximum signed flow rate by:
        bisecting an undirected graph representing the gas pipeline network using at least one of the plurality of pipeline segments to create a left subgraph and right subgraph;
        calculating a minimum undersupply in the left subgraph by subtracting a sum of demand rates for each of the gas receipt facilities in the left subgraph from a sum of minimum production rates for each of the gas production plants in the left subgraph;

calculating a minimum unmet demand in the right subgraph by subtracting a sum of maximum production rates for each of the gas production plants in the right subgraph from a sum of demand rates for each of the gas receipt facilities in the right subgraph;

calculating the minimum signed flow rate for at least one of the pipeline segments as a maximum of a minimum undersupply in the left subgraph and a minimum unmet demand in the right subgraph;

calculating a maximum oversupply in the left subgraph by subtracting the sum of the demand rates for each of the gas receipt facilities in the left subgraph from the sum of the maximum production rates for each of the gas production plants in the left subgraph;

calculating a maximum unmet demand in the right subgraph by subtracting a sum of the minimum production rates for each of the gas production plants in the right subgraph from the sum of the demand rates for each of the gas receipt facilities in the right subgraph; and calculating the maximum signed flow rate for at least one of the pipeline segments as a minimum of the maximum oversupply in the left subgraph and the maximum unmet demand in the right subgraph.

2. The system of claim 1, where a linear model relating energy consumption to industrial gas production is used to calculate the minimum production rate and the maximum production rate at the industrial gas production plant to satisfy a constraint on consumption of energy over the period of time.

3. The system of claim 2, wherein the linear model is developed using a transfer function model.

4. The system of claim 1, ramping constraints on the industrial gas production plant over the period of time are considered in connection with calculating the network flow solution.

5. The system of claim 1, where an error in pressure prediction for each of the plurality of network nodes is bounded and the bounds are used to ensure that the network flow solution produced using the linearized pressure drop model satisfies pressure constraints when a nonlinear pressure drop model is used.

6. The system of claim 1, where the linear pressure drop model for one of the pipeline segments is a least-squares fit of the nonlinear pressure drop relationship within a minimum and a maximum flow range for the pipeline segment.

7. The system of claim 1, where a slope-intercept model is used if an allowable flow range does not include a zero flow condition and a slope-only model is used if the allowable flow range does include a zero flow condition.

8. The system of claim 1, where a linear program is used to create the network flow solution.

9. The system of claim 1, where the control element comprises a steam methane reformer plant.

10. The system of claim 1, where the flow control element comprises an air separation unit.

11. The system of claim 1, where the flow control element comprises a compressor system.

12. The system of claim 1, where the energy input is a flow of natural gas and the industrial gas is hydrogen.

13. The system of claim 1, where the energy input is refinery fuel gas and the industrial gas is hydrogen.

* * * * *